US011258258B2

(12) United States Patent
Jensen et al.

(10) Patent No.: US 11,258,258 B2
(45) Date of Patent: Feb. 22, 2022

(54) MULTI-INPUT POWER CONVERSION AND ENERGY STORAGE

(71) Applicant: Inergy Holdings, LLC, Chubbuck, ID (US)

(72) Inventors: Jonathan Jensen, Pocatello, ID (US);
James Brainard, Pocatello, ID (US);
Thomas Baldwin, Idaho Falls, ID (US);
Sean Luangrath, Highland, UT (US)

(73) Assignee: INERGY HOLDINGS, LLC, Chubbuck, ID (US)

( * ) Notice: Subject to any disclaimer, the term of this patent is extended or adjusted under 35 U.S.C. 154(b) by 279 days.

(21) Appl. No.: 16/567,998

(22) Filed: Sep. 11, 2019

(65) Prior Publication Data

US 2021/0050725 A1  Feb. 18, 2021

Related U.S. Application Data

(60) Provisional application No. 62/885,749, filed on Aug. 12, 2019.

(51) Int. Cl.
*H02J 1/10* (2006.01)
*H02J 3/46* (2006.01)
(Continued)

(52) U.S. Cl.
CPC .............. *H02J 3/32* (2013.01); *H02J 3/38* (2013.01); *H02J 3/383* (2013.01); *H02J 7/0021* (2013.01);
(Continued)

(58) Field of Classification Search
CPC .... H02J 3/32; H02J 7/0021; H02J 7/35; H02J 3/383; H02J 2203/20; H02J 3/38;
(Continued)

(56) References Cited

U.S. PATENT DOCUMENTS

2007/0156257 A1 *  7/2007  Peters ............... G06Q 99/00
                                                        700/22
2010/0076615 A1    3/2010  Daniel et al.
(Continued)

FOREIGN PATENT DOCUMENTS

WO    2010085816 A1    7/2010
WO    2011026220 A1    3/2011
WO    2011055122 A1    5/2011

OTHER PUBLICATIONS

Chang, Hsueh-Hsien, "Load Identification of Non-intrusive Load-monitoring System in Smart Home", Department of Electronic Engineering, Issue 5, vol. 9, http://www.wseas.us/e-library/transactions/systems/2010/42-415.pdf, Dated May 2010, pp. 1-13.
(Continued)

*Primary Examiner* — Daniel Cavallari
*Assistant Examiner* — Rasem Mourad
(74) *Attorney, Agent, or Firm* — Kunzler Bean & Adamson, PC

(57) ABSTRACT

Apparatuses, systems, and methods are presented for energy storage. A plurality of input connectors are configured to receive input power from one or more power sources. A plurality of input power converters are coupled to the input connectors, and are configured to convert the input power to direct current (DC) power for storage. A controller is configured to control power flow through the input power converters on a per-converter basis so that separate converters are separately controlled. One or more output power converters are configured to convert stored DC power to output power for use by one or more loads. The controller is configured to control power flow through the one or more output power converters. One or more output connectors are configured to transfer the output power to the one or more loads.

16 Claims, 9 Drawing Sheets

(51) Int. Cl.
*H02J 3/32* (2006.01)
*H02J 7/00* (2006.01)
*H02J 7/35* (2006.01)
*H02J 3/38* (2006.01)

(52) U.S. Cl.
CPC ................. *H02J 7/35* (2013.01); *H02J 3/386* (2013.01); *H02J 2203/20* (2020.01)

(58) Field of Classification Search
CPC .. H02J 7/34; H02J 3/386; Y02E 10/56; Y02E 10/76; G05F 1/67
See application file for complete search history.

(56) References Cited

U.S. PATENT DOCUMENTS

| | | | |
|---|---|---|---|
| 2010/0191487 A1 | 7/2010 | Rada et al. | |
| 2010/0271222 A1 | 10/2010 | Kerrigan et al. | |
| 2011/0153246 A1 | 6/2011 | Donaldson et al. | |
| 2012/0278014 A1* | 11/2012 | Davies | G01D 4/00 702/61 |
| 2012/0330473 A1* | 12/2012 | Meredith | H02J 13/00016 700/291 |
| 2013/0041516 A1* | 2/2013 | Rockenfeller | H02J 3/46 700/287 |
| 2014/0229030 A1* | 8/2014 | Hardin | H02J 3/005 700/295 |
| 2014/0306526 A1* | 10/2014 | Fontana | H02J 3/00 307/24 |
| 2015/0171632 A1* | 6/2015 | Fry | H02J 7/0045 307/22 |
| 2016/0121735 A1* | 5/2016 | Sugano | B60L 53/16 320/109 |
| 2018/0006470 A1* | 1/2018 | Stacey | H01M 50/20 |
| 2019/0173287 A1* | 6/2019 | Ge | H02J 7/35 |

OTHER PUBLICATIONS

Srinivasan, et al., "Neural-network-based signature recognition for harmonic source identification", IEE Xplore Digital Library, http://ieeexplore.ieee.org/xpl/freeabs_all.jsp?arnumber=1564224, Published Dec. 27, 2005.

Chang, et al. "Load Identification in Neural Networks for a Non-intrusive Monitoring of Industrial Electrical Loads", https://link.springer.com/chapter/10.1007/978-3-540-92719-8_60, 2008.

Luangrath, Sean, "Inergy", Inergy Solar, May 2018, pp. 1-18.

* cited by examiner

MULTI-INPUT POWER CONVERSION AND ENERGY STORAGE

CROSS-REFERENCES TO OTHER APPLICATIONS

This application claims the benefit of U.S. Provisional Patent Application No. 62/885,749 entitled "MULTI-INPUT POWER CONVERSION AND ENERGY STORAGE" and filed on Aug. 12, 2019, for Jonathan Jensen, et al., which is incorporated herein by reference in its entirety for all purposes.

FIELD

This disclosure relates to energy storage and more particularly relates to storing energy from multiple inputs.

BACKGROUND

People may install solar panels or other power sources that use renewable energy for a variety of reasons. For example, power from renewable energy sources may reduce dependence on non-renewable energy from fossil fuels, reduce carbon emissions, reduce power bills, provide backup power for use in a power outage, provide off-grid power for mobile or remote locations, or the like. Solar panels or other renewable energy sources may be installed in residences, commercial spaces, and other locations where renewable energy is available from the sun, wind, a hydro-power reservoir, or the like However, various issues may deter people from installing or using renewable electric power. Costs may be prohibitive for solar panels, for installation, and for related equipment such as batteries for energy storage, an inverter for producing alternating current, or the like. Installation of solar panels as a permanent fixture of a home or building may deter users who do not own the building, or who plan to move or sell the building before the high initial costs of installation would be fully offset by the ongoing benefits of use. Users may find that backup power is not available in a power outage if the utility company that operates the grid requires grid-tied solar or renewable energy systems to power down for safety reasons. Also, power from solar panels may be intermittent on cloudy days, limited at high latitudes, unavailable at night, or the like. Power from other renewable sources may by similarly intermittent, limited, or unavailable due to local conditions. For example, wind power may be unavailable on windless days. Energy storage or a grid connection may compensate for intermittent power generation, so that appliances can be used at night, but a large energy storage system may be prohibitively expensive, while a small energy storage system may not provide grid independence.

SUMMARY

Apparatuses are presented for energy storage. In one embodiment, a plurality of input connectors are configured to receive input power from one or more power sources. In a further embodiment, a plurality of input power converters are coupled to the input connectors, and are configured to convert the input power to direct current (DC) power for storage. In some embodiments, a controller is configured to control power flow through the input power converters on a per-converter basis so that separate converters are separately controlled. In a further embodiment, one or more output power converters are configured to convert stored DC power to output power for use by one or more loads. The controller may be configured to control power flow through the one or more output power converters. In some embodiments, one or more output power connectors are configured to transfer the output power to the one or more loads.

In one embodiment, the controller is configured to control power flow based on a prioritization of power sources. In a further embodiment, the prioritization may be user-controlled. In some embodiments, the controller is configured to control power flow based on one or more parameters relating to the one or more power sources.

In one embodiment, the controller is configured to control power flow through at least one of the input power converters based on a load curve model. In one embodiment, the controller may determine a load curve model based on a power source coupled to the at least one input power converter. In a further embodiment, the controller may control the at least one input power converter to present a load to the power source based on the load curve model. In some embodiments, the controller is configured to periodically adjust at least one parameter of the model.

In one embodiment, the controller is configured to monitor current and voltage over time for at least one of the power sources. In a further embodiment, the controller is configured to identify a type of power source consistent with the monitored current and voltage. In some embodiments, the controller is configured to control power flow through at least one of the input power converters based on the identified type of power source. In a further embodiment, a Global Positioning Satellite (GPS) receiver may identify where the apparatus is located, and the controller may be configured to identify the type of power source based at least partially on the location identified by the GPS receiver.

In one embodiment, one or more batteries are coupled to the plurality of input power converters to receive DC power from the input power converters. In a further embodiment, the one or more batteries are coupled to the one or more output power converters to output DC power to the one or more output power converters.

In some embodiments, one or more stackable battery housings house the one or more batteries. In further embodiments, a stackable head unit housing houses the input connectors, the input power converters, the controller, the one or more output power converters and the one or more output connectors. In some embodiments, one or more interconnects are configured to provide detachable mechanical and electrical connections between pairs of adjacent stackable housings.

In some embodiments, a user interface is configured to present information to a user. Information presented to a user may include information about the input power, information about the one or more batteries, and/or information about the output power. In some embodiments, the user interface may include a display screen and/or a network interface device.

In some embodiments, the one or more output power converters may include an inverter with gallium nitride based power electronics. In one embodiment, the controller may monitor current and voltage over time for at least one of the output connectors. In a further embodiment, the controller may identify a type of load consistent with the monitored current and voltage. In some embodiments, the controller may control output power based on the identified type of load.

In one embodiment, the controller is configured to allocate output power to the one or more loads based on a prioritization of the one or more loads. In some embodiments, the controller is configured to allocate output power to the one or more loads based on communication with a second controller for at least one of the one or more loads.

Methods are disclosed for energy storage. In one embodiment, a method includes receiving input power from one or more power sources at a plurality of input connectors. In a further embodiment, a method includes using a plurality of input power converters to convert the input power to direct current (DC) power for storage. In some embodiments, a method includes controlling power flow through the input power converters on a per-converter basis so that separate converters are separately controlled. In one embodiment, a method includes receiving DC power from the input power converters at one or more batteries coupled to the input power converters. In some embodiments, a method includes controlling power flow through one or more output power converters coupled to the one or more batteries to convert DC power from the one or more batteries to output power for use by one or more loads. In a further embodiment, a method includes transferring the output power to the one or more loads via one or more output connectors.

In one embodiment, controlling the power flow is based on a prioritization of power sources. In some embodiments controlling the power flow through at least one of the input power converters is based on a load curve model. In one embodiment, controlling the power flow includes determining a load curve model based on a power source coupled to at least one input power converter. In further embodiments, controlling the power flow includes controlling the at least one input power converter to present a load to the power source based on the load curve model.

Systems are disclosed for energy storage. A system, in one embodiment, includes at least one solar panel. In one embodiment, a plurality of input connectors are configured to receive input power from one or more power sources, including the at least one solar panel. In a further embodiment, a plurality of input power converters are coupled to the input connectors, and are configured to convert the input power to direct current (DC) power for storage. In some embodiments, one or more batteries are coupled to the plurality of input power converters to receive DC power from the input power converters. In some embodiments, one or more output power converters are coupled to the one or more batteries, and are configured to convert power from the one or more batteries to output power for use by one or more loads. In a further embodiment, one or more output connectors are configured to transfer the output power to the one or more loads. In some embodiments, a controller is configured to control power flow through the input power converters on a per-converter basis so that separate converters are separately controlled, and to control power flow through the one or more output power converters.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
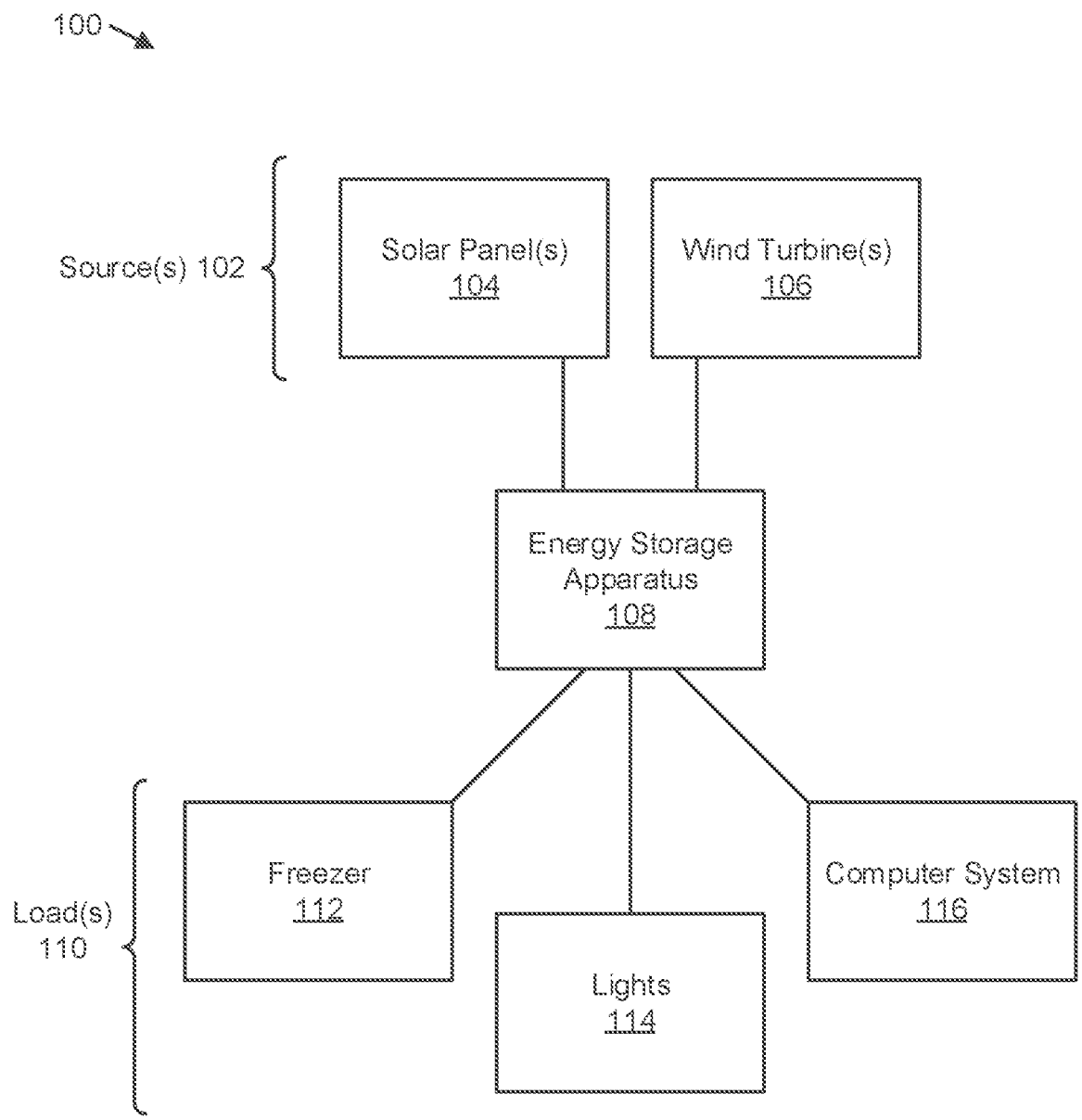
FIG. 1 is a schematic block diagram illustrating one embodiment of a renewable power system.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture ("ISA") instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider). In some embodiments, electronic circuitry including, for example, programmable logic circuitry, field-programmable gate arrays ("FPGA"), or programmable logic arrays ("PLA") may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

FIG. 1 depicts a renewable power system 100. In the depicted embodiment, the system 100 includes one or more power sources 102, an energy storage apparatus 108, and one or more loads 110. In general, in various embodiments, electric power is produced by sources 102, and consumed by loads 110. An energy storage apparatus 108 electrically coupled to the sources 102 and to the loads 110 may distribute power from the sources 102 to the loads 110, may store energy when the sources 102 produce more power than the loads 110 consume, and may produce power from the stored energy when the loads 110 consume more power than the sources 102 produce.

Power sources 102, in various embodiments, may include any devices, machines, installations, or systems capable of providing electrical power to an energy storage apparatus 108. In the depicted embodiment, the sources 102 in the system 100 include one or more solar panels 104, and one or more wind turbines 106. In another embodiment, a system 100 may include more or fewer power sources 102, and/or may include sources 102 of types not shown in FIG. 1. For example, a power source 102 may be, or may include, a solar panel 104, a wind turbine 106, a hydroelectric generator, a diesel generator, a fuel cell, a battery, a connection to a power grid, or the like. A power source 102 may be a device such as a photovoltaic solar panel 104 or a turbine that generates electrical power from another form of energy, or may be a device that stores or distributes electrical power, such as a battery bank or a connection to a power grid. Various other or further power sources 102 may be used in connection with a renewable power system 100 and/or an energy storage apparatus 108.

Loads 110, in various embodiments, may include any devices, machines, installations, or systems capable of consuming electric power. In the depicted embodiment, the loads 110 include a freezer 112, lights 114, and a computer system 116. In another embodiment, a system 100 may include more or fewer loads 110, and/or may include loads 110 of types not shown in FIG. 1. For example, a load 110 may be, or may include, an electric heater, an air conditioner, a ventilation system, an electric stove or oven, electric clothes washers and dryers, other household appliances, or the like. A load 110 may be a device that consumes electrical power or that stores or distributes electrical power, such as a battery bank or a connection to a power grid. For example, in one embodiment of a renewable energy system, multiple energy storage apparatuses 108 capable of receiving, storing, and outputting energy may be networked, to distribute power to where it is needed, and one energy storage apparatus 108 may have another energy storage apparatus 108 connected as a source 102, and/or another energy storage apparatus 108 connected as a load 110. Various other or further loads 110 may be used in connection with a renewable power system 100 and/or an energy storage apparatus 108.

Additionally, in some embodiments, sources 102 or loads 110 may be split up or combined. For example, an array of solar panels 104 may be coupled to the energy storage apparatus 108 as a single power source 102, or as subarrays acting as separate or independent power sources 102. Similarly, household appliances may be coupled to the energy storage apparatus 108 via a household circuit acting as a single load 110, or as separate and independent loads 110.

The energy storage apparatus 108, in the depicted embodiment, may receive power from one or more power sources 102, and may output power to one or more loads 110. In some embodiments, an energy storage apparatus 108 may include input connectors and output connectors for connecting sources 102 and loads 110. In some embodiments, an energy storage apparatus 108 may include power converters for converting electrical power in one form to electrical power of another form. For example, power converters may convert direct current (DC) input to alternating current (AC) output, convert AC input to DC output, convert an input voltage, current, or frequency (for AC power) to a different output voltage, current, or frequency, or the like. Power converters may facilitate power storage and distribution when there is a mismatch between the type of power produced and the type of power consumed. For example, solar panels 104 may produce higher-voltage DC, storage batteries in the energy storage apparatus 108 may receive or output lower-voltage DC, and household appliances may require 120 V AC. Thus, power converters may step down the voltage from solar panels 104 to charge the storage batteries, and may convert lower-voltage DC power from the batteries to higher-voltage AC power for use by the loads 110.

Additionally, in some embodiments, an energy storage apparatus 108 may include or be coupled to components that store energy for later use. For example, as described above, an energy storage apparatus 108 may include storage batteries. In another embodiment, an energy storage apparatus 108 may include or be coupled to a pumped hydroelectric energy storage system where a pump uses power to pump water to an elevated tank or reservoir that can be drained through a hydroelectric generator. For example, the pump may be coupled to the energy storage apparatus 108 as a load 110, and the generator may be coupled to the energy storage apparatus 108 as a source 102. Various other or further types of energy storage may be included in or connected to an energy storage apparatus 108.

In some embodiments an energy storage apparatus 108 may include a controller that controls power flow from sources 102, to loads 110, or into or out of storage. For example, a controller may control power flow through the power converters described above. In some embodiments, a controller may be configured to prioritize sources 102 and/or loads 110. For example, when using pumped hydroelectric storage a controller may be configured to allocate power to the pump with a lower priority than other loads 110 so that energy is stored when there is excess power available, or to draw power from the hydroelectric generator with a lower priority than other sources 102 so that the finite capacity of the reservoir or tank is not diminished when there is power available from other renewable sources 102. A controller may communicate with power converters to control power flow, and may include discrete hardware components such as power transistors for switching, special purpose hardware such as application-specific integrated circuits, and/or programmable hardware such as a field-programmable gate array or a microprocessor that executes computer-readable program code and a memory or storage device to store the code on a non-transitory medium. Embodiments of a controller are disclosed in further detail below with reference to subsequent Figures.

In some embodiments, a controller may control power flow through power converters from the sources 102 to storage on a per-converter basis, by separately or independently controlling separate power converters. The amount of power flow through a power converter from a power source 102 may be the voltage drop across the converter, multiplied by the current flow through the converter (which may also be referred to as the voltage and current from the source 102, or the input voltage and input current). Certain types of power source 102 may produce or transmit power more or less effectively depending on the input voltage and input current provided to the controller. For example, solar panels 104 may provide zero power at the open-circuit voltage with no current through the converter, or at the short-circuit current with no voltage drop across the converter. Solar panels 104 may provide small amounts of power near the open-circuit voltage or the short-circuit current, and may provide greater power flow at an intermediate voltage and current.

In some embodiments, different power sources 102, such as a solar panel 104 and a wind turbine 106, or even a solar panel 104 in full sun and another partially shaded solar panel 104 may have different current-voltage characteristic curves. Thus, coupling the same sources 102 to a single power converter (or another load 110) in parallel so that the voltage from each source 102 is the same and the currents add, or in series so that the current from each source 102 is the same and the voltages add, may result in one or more of the sources 102 producing less power than it otherwise would. Accordingly, in various embodiments, a multi-input energy storage apparatus 108 with multiple inputs coupled to multiple input power converters and a controller that controls the input power converters separately, on a per-converter basis, may increase the amount of renewable energy that is produced, stored, or used, in comparison to a storage or distribution device with a single input, a single input power converter for multiple power sources 102, or multiple input power converters that are not independently controlled.

In the depicted embodiment, the energy storage apparatus 108 both stores energy, and produces output power for loads 110. In another embodiment, an energy storage apparatus 108 may include multi-input power conversion as described herein, but may omit either the storage or output functions and components. For example, in one embodiment, an energy storage apparatus 108 may be a battery charger that stores energy in batteries but that does not include a power inverter or other outputs to use the stored energy. The batteries may be removable or swappable to provide power to loads 110 elsewhere.

In another embodiment, an energy storage apparatus 108 may output power directly to local loads 110 or to a power grid at the same rate that power is received (minus internal power dissipation), without providing batteries or other components to store energy, and may still be referred to as an "energy storage apparatus" despite the lack of storage. In some embodiments, storage may later be added to such an apparatus 108. Also, in some embodiments, an energy storage apparatus 108 may be used to output power to loads 110 even when power sources 102 are not connected or available. For example, where loads 110 are far away from sources 102, a portable energy storage apparatus 108 may be connected to one or more sources 102 to charge its storage batteries at a charging location, and may be disconnected from the sources 102 and moved to a different location where it uses the stored energy to output power to loads 110.

Additionally, although an energy storage apparatus 108 is described herein with reference to renewable power sources 102, an energy storage apparatus 108 with multiple inputs and separate control of input power converter may also be beneficially used when one or more of the sources 102 are non-renewable. For example, an energy storage apparatus 108 with multiple inputs may control power flow from solar panels 104 and a grid (with non-renewable sources 102 on the grid) to maximize or increase power flow from the solar panels 104 and minimize or reduce power demands on the grid. Similarly, in remote locations where power is only intermittently available even from non-renewable sources 102, an energy storage apparatus 108 may still be beneficial to store energy for later use.

In some embodiments, an energy storage apparatus 108 is connected to Cloud resources as part of an Internet of Things (IoT) network, allowing the user to remotely manage and monitor the energy storage apparatus 108. Components used to provide this monitoring and management include an Operating System (OS), a Mobile App (MA), and Cloud Resources (CR), which communicate with each other using various networking technologies, including the internet. These three components, working in unison, allow the energy storage apparatus 108 to be monitored, controlled, and automated, as desired by the user. In some embodiments, the features of the OS (which is integrated into the energy storage apparatus 108) include, but are not limited to, battery controls and updates, providing an API to integrate with home automation solutions such as Amazon Alexa or Google Home, storing the control logic for power allocation, and serving as the integration and communication gateway with the MA and CR. In some embodiments, the OS may also interface with internal sensors such as temperature, current, voltage, etc., in order to properly monitor and manage the inverter and battery charger, as well as the connected batteries. In some embodiments, the MA is not only able to remotely monitor and control the energy storage apparatus 108, but may also provide the user with machine-learning determined energy consumption and battery charging recommendations based on real-time and historical energy consumption metrics, including data visualizations of optimal energy usage patterns. This may prove especially useful in managing multiple charging sources 102 or a network of loads 110 coupled to multiple energy storage apparatuses 108.

In some embodiments, the energy storage apparatus 108 is connected to a user's cloud account which provides services to the user, including, but not limited to: creating a communication bridge between the OS and the MA when the user is not within Bluetooth connectivity distance or on the same local network (e.g. a local WiFi network) to allow the user to continue remote management and monitoring; a central repository providing long-term data aggregation and storage of data that is uploaded regularly by the OS to augment the storage available in the energy storage apparatus 108 and to allow access to historical and current data by the user; and serving as a diagnostic tool for customer service. In some embodiments, the mobile app will also access, utilize, and analyze this data collection to provide smart energy consumption recommendations In some embodiments, a user's cloud repository may also serve as the basis for a management service, where representatives (with the permission of the user) may review the analyzed data and recommend how to further manage electricity use while still maintaining the same level of comfort. In some embodiments, this may also include real-time alerts sent to the mobile app based on the uploaded data compared to the statistical norm for each connected appliance. In a non-limiting example, if the data analysis shows a sudden spike in energy used by the refrigerator, it is likely that the door was left open, and a real-time alert would inform the user so they can check and shut the door. If the door is closed, additional diagnostics can be ascertained by the representatives from the data received from the operating system.

In some embodiments, with permission from the user, data may be collected and aggregated from multiple connected energy storage apparatuses 108 and used for further diagnostic insights, such as profiling different geographical locations based on usage, determining where further upgrades can make the system even more efficient, and providing profiles for resellers and other interested parties on which systems and accessories are most utilized in various locations, to name a few non-limiting examples.

Market predictions show exponential growth in the global solar energy storage market, coming in at $1 billion in the US alone and $5.8 billion globally by the year 2021. Energy storage apparatuses 108, whether small enough to power handheld devices or large enough to power an entire home or commercial space, may be in high demand. These predictions are currently not including markets that are not able to utilize previously available renewable energy options available today, but which portable, compact, and easy-to-use renewable energy storage apparatuses 108 may enable. These potential markets include, but are not limited to, people in a mobile home, including recreational vehicles (RVs) and tiny homes, even if they remain static; people who like to travel, camp, or hunt; people living in a rental home, including apartments, where solar panels 104 can simply be set on a balcony in order to utilize renewable sources 102 without permanent installation (as prohibited by the lease); "preppers" who are preparing for a natural, political or social disaster and want to be able to survive successfully and efficiently in their homes; disaster relief applications where easy-to-use and renewable power sources 102 may make a huge difference in the success and length of restoration; and existing solar installers who see the value in a simple, yet highly efficient renewable energy storage apparatus 108.

Another target market is small businesses around the world which may be enabled by off-grid power or which can share and pool power with other local small businesses in order to spend less on the necessary power and therefore see more return profits in their businesses. One way of addressing those markets is to utilize a traditional zero or low interest payment plan with a micro-finance line-of-credit from a micro-financing lender. A customer is asked to provide a small down payment, on the order of 25-30% of the cost of the system, with the remainder financed over the next 1-2 years. But as a part of that agreement, there is a micro-finance line-of-credit which will make up the difference between the revenue generated from a business enabled by the renewable energy system and the monthly payment, reducing the risk to the system provider. In other embodiments, some or all of the down payment may also be provided by the micro-finance lender.

So, as an example, an entrepreneur in Africa may want to set up a small business to provide cell-phone charging services to a group of villages that are not connected to a power grid. An energy storage apparatus 108 and power sources 102 suitable for that task may retail for $2500. If the entrepreneur is able to raise a $700 down-payment and sign the agreement to purchase the system for $700 down and $100/mo for 18 months with the micro-finance line-of-credit acting as a backup to the payment plan, the system can be delivered and the entrepreneur can start generating revenue right away. So, if the first month they generate $40 in revenue, they pay $40 toward the system payment and $60 is paid by the micro-finance line-of-credit (MFLOC). Over the next few months they grow their revenue, contributing their monthly revenue toward the payment with the MFLOC making up the difference until at 8 months, they are making over $100 in monthly revenue. By that time, they may have drawn about $290 from their MFLOC (including interest). If they are able to continue growing their monthly revenue at the same rate for the next few months, at the end of the 13th month, they will have paid off the MFLOC. By this time, they are generating over $200 in monthly revenue and can fully fund the remaining payments while keeping over $100/mo of the profits until the system is paid off after 18 months. At that point they will own the system, free-and-clear, with no debt and many years of revenue-producing life left in the system, with the sun providing the actual power for free.

As can be readily seen, in many of these potential use-case scenarios, there is a benefit to both the customer and the environment from using a portable energy system, as each time a user moves homes, for example, they can easily take the system with them and use it in the next place, meaning that renewable energy is still being successfully utilized to the benefit of both the customer, and the environment at large.

Figure 2:
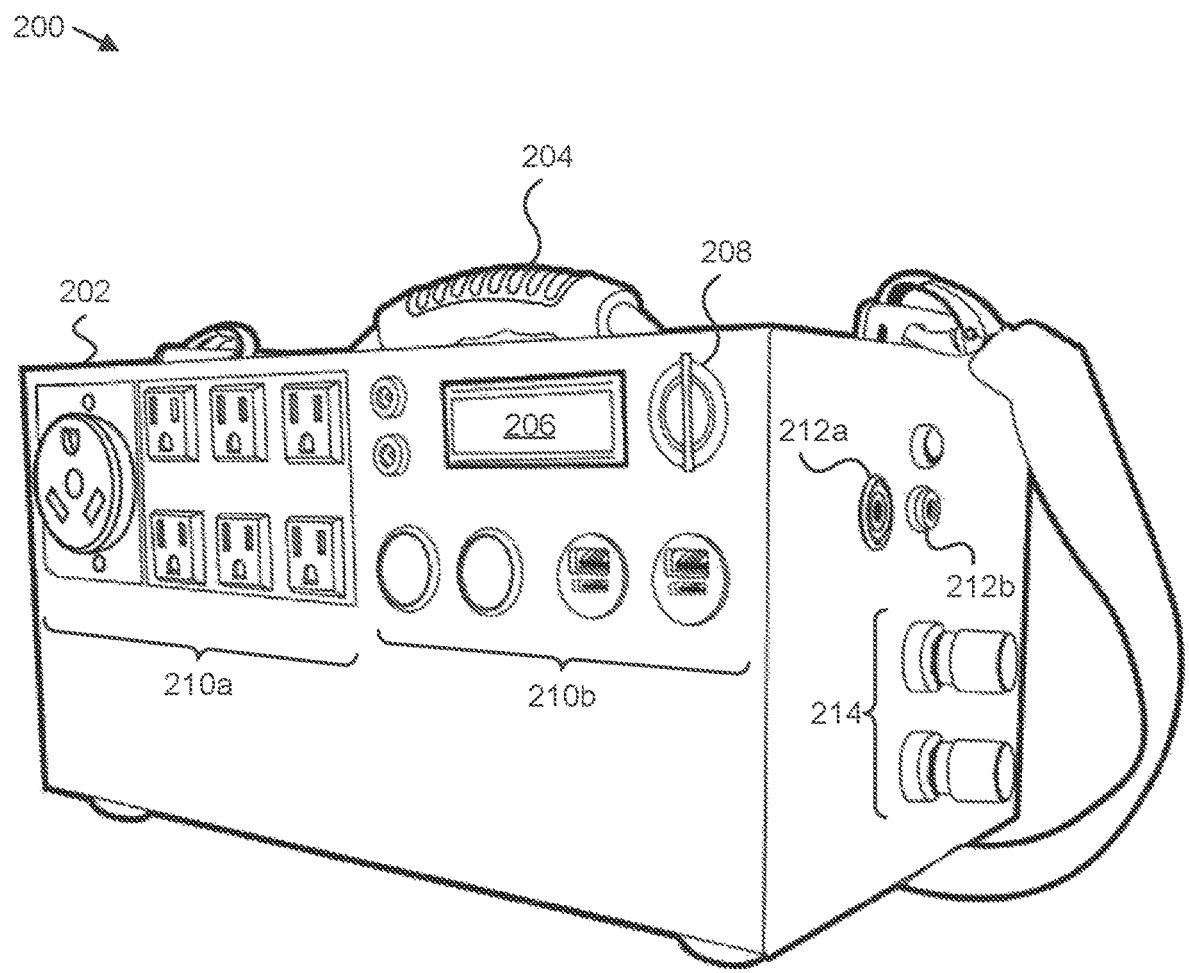
FIG. 2 is a perspective view illustrating one embodiment of an energy storage apparatus.

FIG. 2 depicts one embodiment of an energy storage apparatus. The energy storage apparatus 200 may be substantially similar to the energy storage apparatus 108 described above with reference to FIG. 1, and may receive power from sources 102, store energy, and/or output power to loads 110. In the depicted embodiment, the energy storage apparatus 200 includes a housing 202, a carry handle 204, a display screen 206, a power switch 208, output connectors 210, input connectors 212, and external storage connectors 214.

A housing 202, in various embodiments, may house or contain components such as input connectors 212 and output connectors 210, input power converters coupled to the input connectors 212, output power converters coupled to the output connectors 210, a controller that controls the power converters, and/or batteries or other storage. In the depicted embodiment, components of an energy storage apparatus 200 are disposed in a single housing 202. In another embodiment, some components of an energy storage apparatus 200 may be disposed outside the housing 202, or in a separate housing. For example, batteries may be connected via the external storage connectors 214. Multiple stackable or modular housings may be connected in an energy storage apparatus, as described below with reference to FIG. 3.

In the depicted embodiment, the housing 202 and other components are sized, selected, or otherwise configured to provide a lightweight, compact, and/or portable energy storage apparatus 200. A lightweight compact and/or portable energy storage apparatus 200 may facilitate use where sources 102 and loads 110 are mobile, such as in a recreational vehicle with solar panels 104 attached, or may facilitate non-permanent installation such as in an apartment or condominium. Such an apparatus 200 may, in some embodiments, be installed as a fixture of a building. For example, the apparatus 200 may be used for receiving input power and inverting output power as part of a larger permanently installed grid-tied system.

In the depicted embodiment, the apparatus 200 includes output connectors 210 for some larger appliances or loads 110 but not for a whole home or building, and is thus of intermediate size with an intermediate storage capacity. In various embodiments energy storage apparatuses 200 may be provided in a variety of sizes and storage capacities to address various applications and needs. For example an energy storage apparatus 200 may be a small, portable solar powered quick charger for cell phones and other portable electronic devices; a compact, solar powered "off-grid" system for powering various larger appliances; a whole-home or whole-building "off-grid" systems to power an entire building solely from renewable energy sources 102. An "off-grid" energy storage apparatus 200 may not be connected to a local utility grid, or may be connected to the local grid with components allowing the apparatus 200 to be disconnected from the grid if needed. For example, an "off-grid" energy storage apparatus 200 may include a grid-tie switch that couples the apparatus 200 to a grid and that is operable (e.g., manually by a user or automatically based on sensing grid power availability) to disconnect the apparatus 200 from the grid in a power outage. Thus, an off-grid apparatus 200 may provide power during a blackout without energizing grid power lines (presenting a safety risk to utility workers) or overloading appliances when grid power returns.

In some embodiments, a portable, lightweight energy storage apparatus 200 (such as the depicted embodiment) may be easily installed or uninstalled, or used in a variety of locations with modular energy storage (e.g., separate battery modules), allowing the storage capacity of an installation to be easily customized. Ease of installation and expandability may reduce overall costs or allow users to spread costs out over time.

The housing 202, in various embodiments, may be made of metal, plastic, composite materials or the like, and may be grounded or isolated depending on the use case. In one embodiment a housing 202 may be water resistant for outdoor use. In another embodiment, a housing 202 may include holes for ventilation. One of skill in the art will recognize various other or further ways to house components of an energy storage apparatus.

The carry handle 204 is coupled to the housing 202 for picking up and moving the apparatus 200. A carry handle 204 may include a rigid or flexible handle, a strap, a component attached to the housing 202, indentations formed in the housing 202, or the like. In some embodiments, a carry handle 204 may be omitted.

A display screen 206 and/or a power switch 208 may be part of a user interface for the apparatus 200. A user interface may be operable by a user to control or provide input to the apparatus 200. In some embodiment a user interface may use a display screen 206 to present information to a user. Information presented to a user may include information about input power, information about batteries or other storage, and/or information about output power. Information about input power may include current, historical, and/or predicted information about power from sources 102, such as current power levels from one or more sources 102, total energy received from one or more sources 102 over a period of time, a history of where currently-stored energy came from, predicted energy generation for a future time period, or the like. Information about batteries or other storage may include current historical, and/or predicted information about storage, such as individual battery energy levels, total stored energy levels, numbers of charge/discharge cycles, total capacity levels, a recommended replacement data for batteries, or the like. Information about output power may include current, historical, and/or predicted information about power to loads 110, including current power output, a history of power output, predicted power demands, or the like.

The power switch 208, in some embodiments, is operable by a user to turn the apparatus 200 on or off. In an off state, the apparatus 200 may neither receive nor output power. In an on state, the apparatus 200 may receive and/or output power. In some embodiments, a multi-position power switch 208 may allow a user to select one or more states such as a "charge only" state with no power output, a "discharge only" state with no power input, an "AC only" state with no DC power output, a "DC only" state with no AC power output, or the like.

The output connectors 210, in the depicted embodiment, include AC output connectors 210a and DC output connectors 210b. As used herein, the term "connector" may refer to any device used to connect electrical conductors, and may include plugs, sockets, hermaphroditic connectors, or the like. An output connector 210, in various embodiments, may be any plug, socket, or other type of connector capable of connecting power to a load 110.

In various embodiments, AC output connectors 210a are used to provide AC power to loads 110. In the depicted embodiment, AC output connectors 210a include power outlets conforming to the standards of the U.S. National Electrical Manufacturers Association (NEMA), such as a NEMA TT-30R receptacle to provide power to a recreational vehicle, and NEMA 5 receptacles for common North American electric appliances. In some embodiments, AC output connectors 210a may include sockets or outlets more commonly used outside North America, such as British, Australian, European, or Japanese sockets, or an "international" socket shaped to accept multiple types of plugs. Various other or further AC receptacles or connectors may be suitable for use as AC output connectors 210a.

In various embodiments, DC output connectors 210b are used to provide DC power to loads 110. In the depicted embodiment, DC output connectors 210b include 12 V cigarette lighter sockets, ports for connecting LED lights, USB-A ports, and USB-C ports. In some embodiments, DC output connectors 210b may include various other or further DC receptacles or connectors. Although the depicted embodiment includes a variety of both AC and DC output connectors 210, some embodiments of an energy storage apparatus 200 may include more or fewer output connectors 210, different types of connectors 210 of different types, AC output connectors 210 only, DC output connectors 210 only, or the like.

An input connector 212, in various embodiments, may be any plug, socket, or other type of connector capable of receiving power from a source 102. In some embodiments, an energy storage apparatus 200 may include multiple input connectors 212. For example, in the depicted embodiment, the apparatus 200 includes a 30A "Speakon" connector 212a for high-current DC input, and a barrel connector 212b for low-current DC input. In some embodiments, an apparatus 200 may include various types of connectors for different power sources 102. For example MC4 and or EC8 connectors may be provided for receiving DC input power from solar panels 104, a NEMA plug may be provided for receiving AC input power from the local power grid, screw terminals may be provided for longer-term installation of source connections (e.g., behind a protective panel as in a circuit breaker box), or the like. In another embodiment, an apparatus 200 may include more or fewer input connectors 212, and may include various other or further types of input connectors 212.

In various embodiments, input power converters may be coupled to input connectors 212 to convert input power from one or more sources 102 to DC power for storage. Conversely, output power converters may be coupled to output connectors 210 to convert stored power (e.g., from batteries) to output power for use by one or more loads 110. Input and output power converters are described in further detail below, with reference to subsequent Figures.

In the depicted embodiment, the apparatus 200 includes internal batteries. In some embodiments, the storage capacity of the apparatus 200 may be expandable by connecting additional batteries via external storage connectors 214. (In some embodiments, however, a non-expandable apparatus 200 may not include external storage connectors 214). In another embodiment, the apparatus 200 may not include internal batteries, and batteries may be connected via the external storage connectors 214. In the depicted embodiment, the external storage connectors 214 are posts for connecting ring terminals. In another embodiment, external storage connectors 214 may be another type of connector. In some embodiments, external storage connectors 214 may provide a direct connection to internal batteries. In another embodiments, power converters or regulators may regulate power flow into or out of the apparatus 200 via external storage connectors 214, and a controller may control power flow via the external storage connectors 214. For example, a controller may charge internal batteries before diverting power to external batteries.

Figure 3:
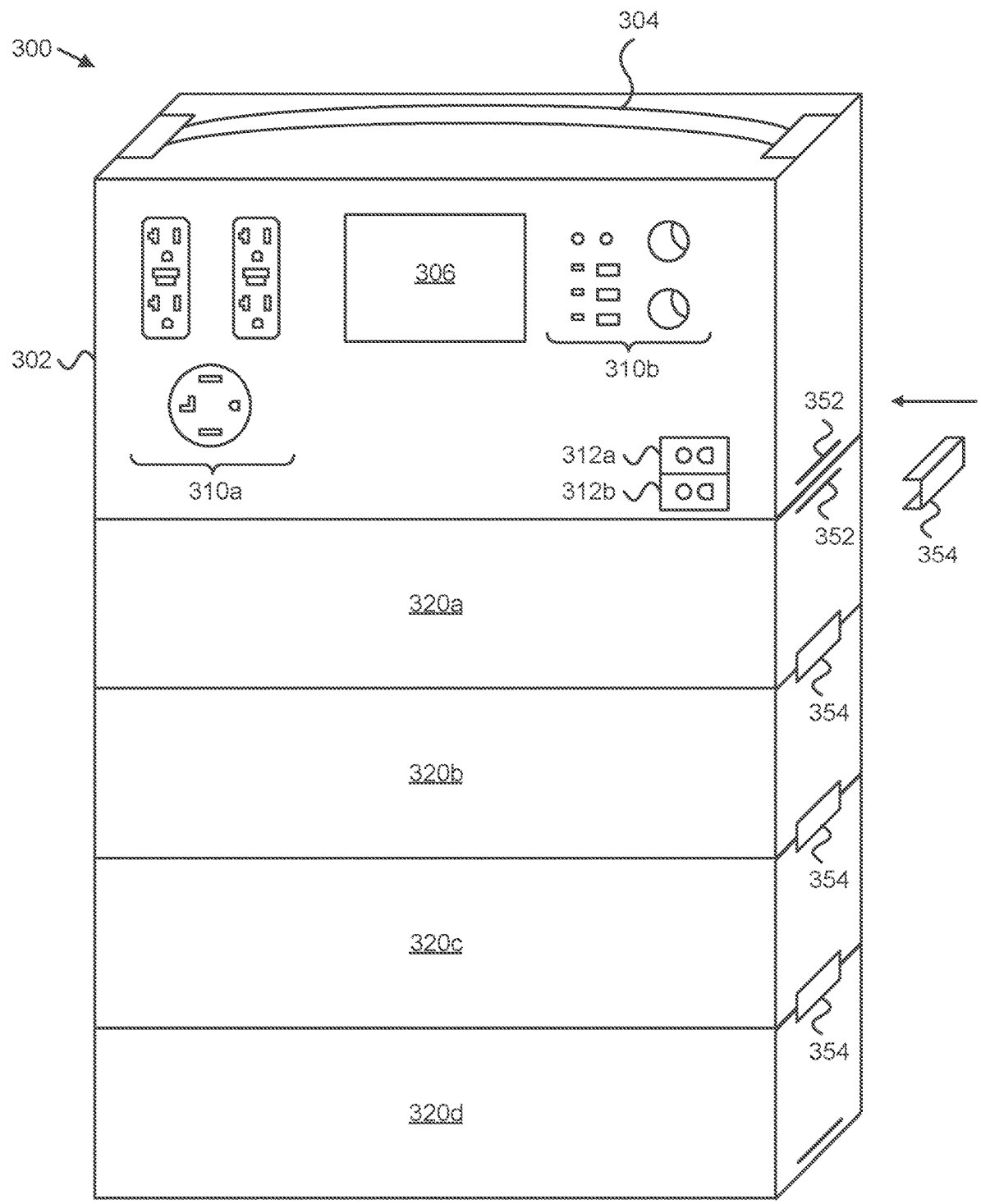
FIG. 3 is a perspective view illustrating another embodiment of an energy storage apparatus.

FIG. 3 is a perspective view illustrating another embodiment of an energy storage apparatus 300. The energy storage apparatus 300, in the depicted embodiment, may be substantially similar to the energy storage apparatuses 108, 200 described above, including a handle 304, a display screen 306, AC output connectors 310a, DC output connectors 310b, and input connectors 312, which may be substantially as described above, like numbers referring to like elements.

The AC output connectors 310a in the depicted embodiment, include ground-fault circuit interrupter (GFCI) outlets for 120 V AC output, and a NEMA 14-30R connector for 240 V AC output. The input connectors 312, in the depicted embodiments, include at least two EC8 connectors for keyed, tool-less, weather-resistant connection and disconnection of DC sources 102 such as solar panels 104. In some embodiments, additional input connectors 312 or accessories such as lines for coupling solar panels 104 to the input connectors 312 may be included in an apparatus 300.

The display screen 306, in the depicted embodiment, is a touch screen. A user interface including a touch screen 306 may display information to a user as described above with reference to FIG. 2, and may also use the screen 306 to receive input from the user to control the apparatus 300. In some embodiments, a touch screen 306 may be used to control the on/off state (or other state) of the apparatus 300, as described above with reference to a power switch 208. Control via a touch screen 306 may avoid unintentional activation or deactivation of the apparatus 300 that might occur if a physical power switch 208 is accidentally jostled during installation, use, or uninstallation.

Additionally, in certain embodiments, a user interface may include a network interface device. A network interface device may be a wired or wireless network interface controller (NIC), capable of sending and/or receiving information via the internet or another computer network. Thus, a user may use an application on another device such as a computer, tablet, smart phone, or the like, to receive information from the apparatus 300 or send information to control the apparatus 300. For example, the functions described above with reference to a touch screen 306 may also be performed by a remote management and monitoring app operating on a user's mobile device and connected over the internet to a network interface device in the apparatus 300. Information may also be stored remotely (e.g., on the "cloud" or on a remote server) and accessed by a user even when the apparatus 300 is disconnected or off. For example, a battery history or other historical information may be uploaded by the apparatus 300 to remote storage for subsequent access by a remote user. Similarly, configuration settings may be uploaded by a user to remote storage, to be retrieved by the apparatus 300 when the apparatus 300 is reconnected or turned back on.

In the depicted embodiment, the apparatus 300 further includes a head unit housing 302, battery housings 320, and interconnects 354. In the depicted embodiment, the head unit housing 302 may be similar to the housing 202 described above with reference to FIG. 2, and may house or contain input connectors 312, the output connectors 310, input power converters coupled to the input connectors 312, output power converters coupled to the output connectors 310, and a controller that controls the power converters. In various embodiments a head unit housing 302 may include or omit batteries or other energy storage.

One or more battery housings 320 and the head unit housing 302 may be, made of metal, plastic, composite or the like. Housings 302, 320 may be weather resistant for outdoor use, or may have holes for ventilation. Housings 302, 320 may be substantially as described above with reference to the materials or configuration of the housing 202. One or more battery housings 320 may house or contain one or more batteries. In various embodiments, the apparatus 300 may be a modular apparatus 300 with different components separately enclosed and portable in different housings 302, 320, which may be disconnected for transport, or which may be expanded or reduced by connecting or disconnecting housings 302, 320.

In the depicted embodiment, the head unit housing 302 and the one or more battery housings 320 are stackable. With stackable housings 302, 320, a battery housing 320 may support another batter housing 320 or a head unit housing 302. In the depicted embodiment, the head unit housing 302 is stacked at the top of four battery housings 320. In another embodiment with stackable housings 320, the head unit housing 302 may also support one or more battery housing 320, and may not be disposed at the top of the stack. Stackable housings 302, 320 may, in some embodiments, include features that facilitate stacking, such as indentations at the top of housings 302, 320 to match support legs at the bottom of other housings 302, 320, matching perimeters to avoid an overhang, strong support walls to support other housings 302, 320, or the like. Various other or further features may be suitable for making housings 302, 320 stackable.

In some embodiments, one or more interconnects 354 may provide detachable mechanical and electrical connections between pairs of adjacent stackable housings 302, 320. For example, in the depicted embodiment, slots 352 at the top and/or bottom of housings 302, 320 match up with slots 352 in other housings 302, 320 when the housings 302, 320 are stacked, and an interconnect 354 may have an upper portion that engages an upper slot 352 and a lower portion that engages a lower slot 352. In the depicted embodiment, interconnects 354 are disposed at the right side (depicted) and the left side (not visible in FIG. 3) of housings 302, 320. In another embodiment, interconnects 354 may be disposed on four sides of housings 302, 320, on front and back sides of housings 302, 320, or the like.

In various embodiments, an interconnect 354 may provide an electrical connection between a pair of adjacent housings (e.g., a head unit housing 302 and a battery housing 320, or a pair of battery housings 320) using one or more conductors. For example, in the depicted embodiment, metal prongs in the interconnect 354 may engage conductors in the slots 352 to provide an electrical connection similar to a plug and socket connection. The interconnect 354 may provide a mechanical connection using the conductors that provide the electrical connection, or in another way. For example, large conductors for high current connections may also be strong enough to provide a stable mechanical connection between a pair of housings 302, 320. In another embodiment, an interconnect 354 may include a mechanical connector separate from the electrical connections, such as a physical latch. Various other or further types of mechanical and electrical connections may be used in an interconnect 354.

An apparatus 300 with modular or stackable housings 302, 320 may be portable for a variety of use cases, and may be consequently light-weight, easy to install and uninstall, and able to be set up anywhere with modular energy storage allowing the storage capacity of the apparatus 300 to be easily customized for a particular installation. The modular or stackable housings 302, 320 may allow a customer or user to add additional energy storage in further battery housings 320 to their system themselves, after the initial installation, without needing professional installation, to adapt to changing needs or to spread the cost of their apparatus 300 out over time.

In some embodiments, the apparatus 300 is provided in its entirety as a kit which can be simply plugged in and is ready to use without professional installation at all. In some embodiments, an installation kit may allow a homeowner to install the apparatus 300 in their home (e.g., with a connection to home wiring, a switch for grid-tied or grid-disconnected operation, or the like), but may still allow the user to easily remove the apparatus 300 from the home to use elsewhere, such as in a recreational vehicle or a new home.

In some embodiments, an apparatus 300 with stackable or modular housings 302, 320 may enable the adoption of improved battery technology over time (e.g., in new battery housings 320) without requiring replacement of the head unit housing 302 (although a software upgrade for the controller may be involved). Because components of the apparatus 300 other than the batteries themselves are contained in the head unit housing 302, the number of battery housings 320 included in the apparatus 300 is scalable. In some embodiments, batteries may be swappable between two or more apparatuses 300. For example, a modular battery housing 320 (and the batteries contained therein) may be charged while connected to a first head unit housing 302, removed, and connected to a second head unit housing 302 to use the stored energy at another location. In further embodiments, batteries may be hot-swappable, and a battery housing 320 may be connected to or disconnected from a head unit housing 302 without powering down the components in the head unit housing 302.

In some embodiments, housings 302, 320 (and the components contained in them) may be compact and lightweight in order to allow portability in different usage scenarios. In the depicted embodiment, the head unit housing 302 and included components may weigh 15-20 pounds, with battery housings 320 (and the components contained in them) weighing 7.5 pounds, creating a total weight of weight of about 75-80 pounds for a 4 kWh apparatus 300 with 4 battery housings 320. This makes the apparatus 300 easily transportable, as each individual housing 302, 320 can be easily carried. By contrast, other energy storage systems without modular or stackable housing 302, 320 may be several times the size and weight of the apparatus 300.

Figure 4:
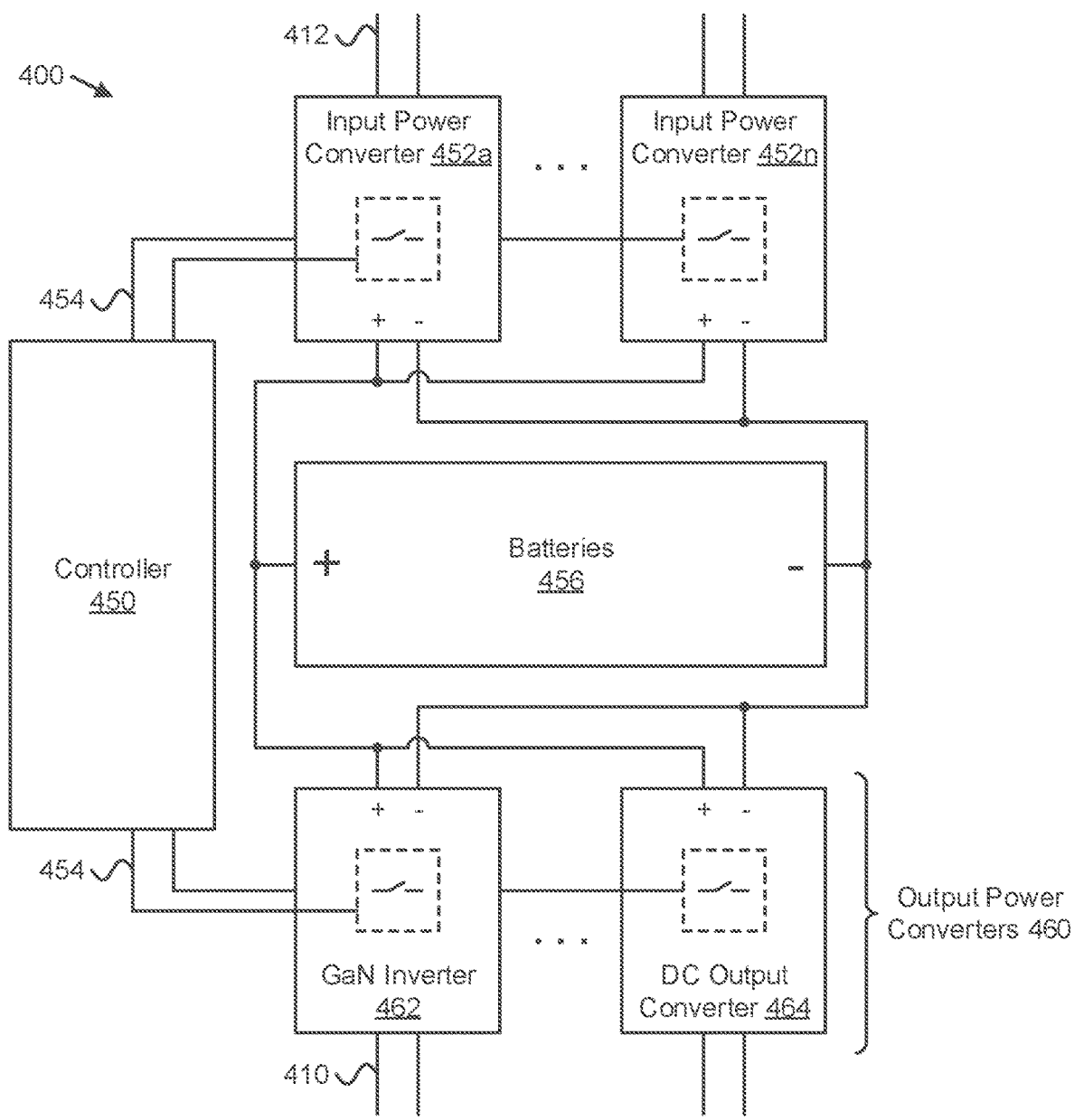
FIG. 4 is a schematic block diagram illustrating components of an energy storage apparatus, in one embodiment.

FIG. 4 is a schematic block diagram illustrating components 400 of an energy storage apparatus, in one embodiment. The components 400 depicted in FIG. 4 may be used in an energy storage apparatus 108, 200, 300, as described above with reference to FIGS. 1-3. In the depicted embodiment, input connectors 412 and output connectors 410 may be substantially as described above. In the depicted embodiment, the components include input power converters 452, one or more batteries 456, output power converters 460, and a controller 450.

As described above, multiple input connectors 412 may receive input power from one or more power sources 102, such as solar panels 104, wind turbines 106, a hydroelectric generator, a diesel generator, a fuel cell, a battery, a connection to a power grid, or the like. Similarly, one or more output connectors 410 may couple or transfer output power to one or more loads 110, such as a freezer 112, lights 114, a computer system 116, an electric heater, an air conditioner, a ventilation system, an electric stove or oven, electric clothes washers and dryers, other household appliances, or the like.

The term "input power" may be used to refer to power received at input connectors 412 or from sources 102, whether referring to the total power received or to aspects of the power flow such as a received voltage, current or frequency. Similarly, the term "output power" may be used to refer to power output by output connectors 410 or to loads 110, referring to the total power received or to aspects of the power flow. Thus, even in balanced conditions, when the input power level matches the output power level, the input power and output power may be referred to as being different if the input power is DC and the output power is AC, if the output power is at a different voltage than the input power, or the like.

In general, in various embodiment, the term "power converter" (including input power converters 452 and/or output power converters 460) may refer to any component or set of components that converts electrical power in one form to electrical power of another form. For example, power converters may convert DC power to AC power, convert AC power to DC power, convert an input voltage, current, or frequency (for AC power) to a different output voltage, current, or frequency, or the like.

In the depicted embodiments, input power converters 452 and output power converters 460 are switched-mode power converters, in which at least one component such as an inductor, a transformer, or a capacitor, is capable of storing energy in a magnetic or electric field and releasing the stored energy via an output current, and where switching at the input and/or the output of the energy-storing component transforms power in one form (e.g., at an input voltage and current point) to power in another form (e.g., with higher voltage and lower current, or with lower voltage and higher current). For example, power converters for DC to DC power conversion may be buck converters, boost converters, buck-boost converters (inverting or four-switch), split-pi converters, Ćuk converters, single-ended primary-inductor converter (SEPIC) converters, transformer-based converters or the like. Various converter topologies may be suitable in different embodiments, depending on the form of the input power, battery voltages, the form of the output power, or the like.

In FIG. 4, a switch is depicted in dashed lines in each of the input power converters 452 and output power converters 460, indicating that, regardless of topology, they are switched-mode power converters with switching controlled by the controller 450 via control lines 454. The depiction of a single switch per power converter is intended as illustrative and not limiting, as the controller may control multiple switches in a half-bridge, an H-bridge, or the like. Switching components may include power transistors or other switching components such as silicon-controlled rectifiers, TRI-ACs, gate turn-off thyristors, or the like. In some embodiments, at least one switch may be controlled by the controller 450, but switching in another location in a power converter may be provided by an un-controlled component such as a diode. Switched mode power converters may avoid power losses in linear components. However, in another embodiment, a power converter may be another type of power converter such as a linear voltage regulator.

Additionally, a power converter configured for AC input may include a rectification stage or may couple AC directly to an energy-storing component such as an inductor or transformer. A power converter configured for AC output may include an inversion stage, and may be referred to as an inverter. For example, a transformer-based inverter may convert low-voltage DC to low-voltage line-frequency AC, and use a transformer to step up the AC to line voltage. A high-frequency inverter may use high-frequency switching to step up low voltage DC to higher-voltage DC, followed by inversion to produce line-frequency AC output.

In certain embodiments, AC input and DC input may be handled by the same type of input power converter 452 or by different input power converters 452 (e.g., with different types of input connectors 412 for AC and DC power). For example, in one embodiment, an input power converter 452 with a rectification stage may be provided for handling AC or DC input power. In another embodiment, an input power converter 452 with a rectification stage may be used for AC input power only, while an input power converter 452 with a rectification stage is used for DC power (to avoid power losses in rectification components).

Similarly, in certain embodiments, AC output and DC output may be handled by the same type of output power converter 460 or by different output power converters 460. For example, in the depicted embodiment, an inverter 462 is provided to convert DC power from the batteries 456 to AC power for output, and a separate DC output converter 464 is provided to convert DC power from the batteries 456 to DC power for output. However, in some embodiments, an inverter 462 may include one or more DC power stages stepping up battery voltages to higher voltages prior to line-frequency inversion, and DC output power may be drawn from a DC stage of the inverter 462 (possibly with some additional voltage or current regulation in a DC output stage).

The input power converters 452, in the depicted embodiment, are coupled to the input connectors 412, and are configured to convert the input power to DC power for storage. In the depicted embodiment, one or more batteries 456 are coupled to the input power converters 452 to receive and store the DC power produced by the input power converters 452. In another embodiment, DC power produced by the input power converters 452 for storage may be stored in another way, in ultracapacitors, in a pumped hydroelectric system, or the like. In some embodiments, DC power produced by the input power converters 452 for storage may be used without being stored. For example, if loads 110 are connected that demand more power than the sources 102 produce, output power converters 460 may use all the power from the input power converters 452, bypassing the batteries 456, and draw additional power from the batteries 456. Nevertheless, the power produced by the input power converters 452 may be referred to as DC power "for storage" because it is usable to charge the batteries 456 or another form of energy storage.

FIG. 4 depicts one or more batteries 456 with a single positive terminal and a single negative terminal. In certain embodiments, multiple batteries 456 may be connected to power converters 452, 460 in parallel, in series, or in series strings that are connected in parallel. Various battery topologies of battery banks may be used with an energy storage apparatus 108, 200, 300 as disclosed herein.

In some embodiments, an input power converter 452 acts as a load from the perspective of a connected power source 102, in that it receives power from the power source 102, and as a source from the perspective of batteries 456, in that it provides power to the batteries 456. In the depicted embodiment, the input power converters 452 are configured to act as current sources for the batteries 456, and are coupled to the batteries 456 in parallel. The controller 450 may operate the input power converters 452 to increase the current to the batteries 456 when more power is available or the batteries are discharged, and to decrease the current to the batteries 456 when less power is available or when the batteries are fully charged, or charged above a threshold level. Controlling the current output of input power converters 452 allows a plurality of input power converters 452 to be coupled to the batteries 456 in parallel to charge the batteries 456 from multiple power sources 102. Multiple input power converters 452a-n may be provided for multiple input connections (although only two are depicted in FIG. 4).

Additionally, a controller 450 may operate an input power converter 452 to present a load to a power source 102 with a particular virtual resistance. For a resistor, the resistance R is defined as the voltage V across the resistor, divided by the current I through the resistor. Although an input power converter 452 is not a simple resistor, a "virtual resistance" of the input power converter 452 may similarly be the ratio of the voltage across the inputs to the current drawn by the input power converter 452. The controller 450 may control the input voltage and/or current for an input power converter 452 (e.g., by controlling switching components in a switched-mode power converter), subject to characteristics such as a current-voltage curve for the power source 102 connected to the input power converter 452, thus presenting a virtual resistance to the power source 102. Different power sources 102 may have different current-voltage characteristics. Thus, in some embodiments, using a controller 450 to independently or separately control multiple input power converters 452 may use available power more effectively than a single input power converter 452 or multiple non-independent power converters 452 coupled to multiple sources 102.

The controller 450, in the depicted embodiment, is coupled to the input power converters 452 via control lines 454, and is configured to control power flow through the input power converters 452 on a per-converter basis such that separate input power converters 452 are separately controlled. In some embodiments, the controller 450 may also be coupled to one or more output power converters 460 via control lines 454, and may be configured to control power flow through one or more output power converters 460. A controller 450, in various embodiments, include discrete hardware components such as power transistors for switching, special purpose hardware such as application-specific integrated circuits, and/or programmable hardware such as a field-programmable gate array. In some embodiments, controller 450 may include a microprocessor that executes computer-readable program code and may include or be coupled to a memory or storage device to store the code on a non-transitory medium.

As power is the product of current and voltage, the controller 450 may control power flow through a power converter by controlling total power into or out of the power converter, or by controlling aspects of the power flow such as an input voltage, an input current, or an output voltage, current, or frequency. As described above with reference to switched-mode power converters, the controller 450 may control power flow by operating switching components of the power converters. For example, a switching component may be controlled by a chain of pulses that alternate between an "on" voltage and an "off" voltage" for and the controller 450 may control or modify parameters of the pulse chain such as a pulse frequency, pulse width, duty cycle (e.g. ratio of time on to total time), or the like. Controlling power flow may include controlling input voltage or current to maximize or increase power from a power source 102, reducing power flow in response to conditions such as a high battery charge state, or the like. A skilled person will recognize other or further ways for a controller 450 to control power flow through a power converter.

The controller 450 may control input power converters 452 separately or independently, on a per-converter basis. In various embodiments, control on a "per converter" basis may refer to a controller 450 that is capable of altering power flow though one input power converter 452 separately or independently of power flow through another input power converter 452. For example, where two strings of solar panels 104 are connected as separate sources 102, if the light on a first string increases (e.g., due to moving clouds) while a second string remains partially shaded, the controller 450 may draw more power from the first string through a first input power converter 452, without affecting the current from or voltage across the second string. In various embodiments, a controller 450 that provides separate, per-converter control of separate input power converters 452 may use available power more efficiently or effectively than when only a single input power converter 452 is provided or when multiple input power converters 452 are non-independently controlled.

The batteries 456, in the depicted embodiment, may be rechargeable batteries such as lithium ion batteries, lead-acid batteries, or the like. In another embodiment, another energy storage component may be used. One or more output power converters 460 are coupled to the batteries 456, and are configured to convert power from the batteries 456 to output power for use by one or more loads 110. In some embodiments, multiple output power converters 460 may be provided. For example, in the depicted embodiment, the output power converters 460 include at least an inverter 462 and a DC output converter 464. In another embodiment, a single output power converter 460 may be provided. For example, if an energy storage apparatus 108 is configured as a small, portable cell phone charger, it may include a DC output converter 464 with no AC output. Various configurations of output power converters 460 may be provided based on types of loads 110, standards for output connectors 410, and the like. In the depicted embodiment, the output power converters 460 are controlled by the controller 450 via control lines 454 (e.g., by controlling switching components of switched-mode power converters).

In the depicted embodiment, the output power converters 460 include an inverter 462 with gallium nitride (GaN) based power electronics. Power electronics may include switching components for high-frequency or line-frequency switching and/or rectification components, such as transistors, diodes, thyristors, and the like. Gallium nitride-based power electronics such as GaN transistors may be able to switch faster and at much higher frequencies than the silicon transistors, increasing efficiency of the inverter 462 compared to a silicon-based inverter. For example, an apparatus 108 with a GaN inverter 462 may provide 96%-98% efficiency, compared to the 90%-92% efficiency of comparable silicon-based inverters. Additionally, a high-frequency GaN inverter 462 may be considerably lighter and more portable than a line-frequency transformer-based inverter with a large iron core.

Figure 5:
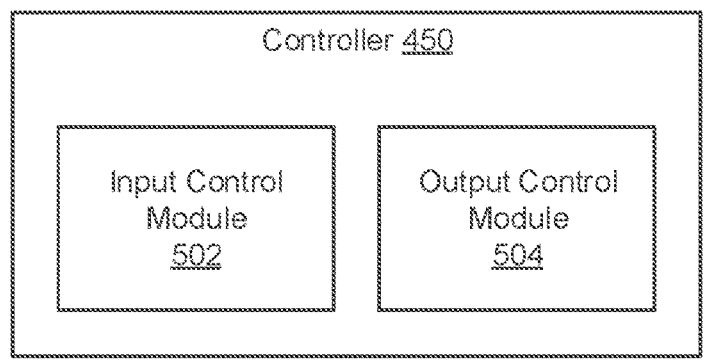
FIG. 5 is a schematic block diagram illustrating one embodiment of a controller for an energy storage apparatus.

FIG. 5 depicts one embodiment of a controller 450, which may be substantially as described above with reference to FIG. 4. In the depicted embodiment, the controller 450 includes an input control module 502 and an output control module 504.

The controller 450 may use the input control module 502 to control power flow through input power converters 452. The input control module 502 may include or be in communication with input power converters 452 and with sensing hardware for detecting aspects of power flow through the input power converters 452 or into the batteries 456, such as input voltages and/or currents, total input power, charging current into the batteries 456, battery voltages, or the like.

Similarly, the controller 450 may use the output control module 504 to control power flow through output power converters 460. The output control module 504 may include or be in communication with output power converters 460 and with sensing hardware for detecting aspects of power flow through the output power converters 460 or from the batteries 456, such as output voltages and/or currents, total output power, discharge current from the batteries 456, battery voltages, or the like. Further embodiments of an input control module 502 and an output control module 504 are described below with reference to FIG. 6.

The input control module 502, in some embodiments, may control separate input power converters 452 separately, on a per-converter basis. Per-converter charge control may allow multiple power sources 102 to concurrently or alternatively provide energy to the batteries 456. The ability to utilize multiple energy sources 102, including other renewable energy sources 102, in place of or in addition to solar power, may facilitate charging the batteries 456 with an appropriate renewable energy source 102 for a particular location, or adaptation to varying environmental conditions such as using both solar and wind power sources 102 which each provide power that varies independently of each other. Per-converter charge control with multiple inputs may allow an energy storage apparatus 108 to provide power for extended periods of time, up to and including full-time power availability, and may alleviate problems of solar-only energy systems that are unable to charge a battery 456 or provide power during cloudy days or during the night. Similarly, a multi-input energy storage apparatus 108 may support multiple types of power sources 102 and may be useful where solar power is not cost effective due to high latitudes or regular poor weather conditions, by using energy from other renewable energy sources 102 (e.g. wind turbine 106, hydropower, or geothermal).

Figure 6:
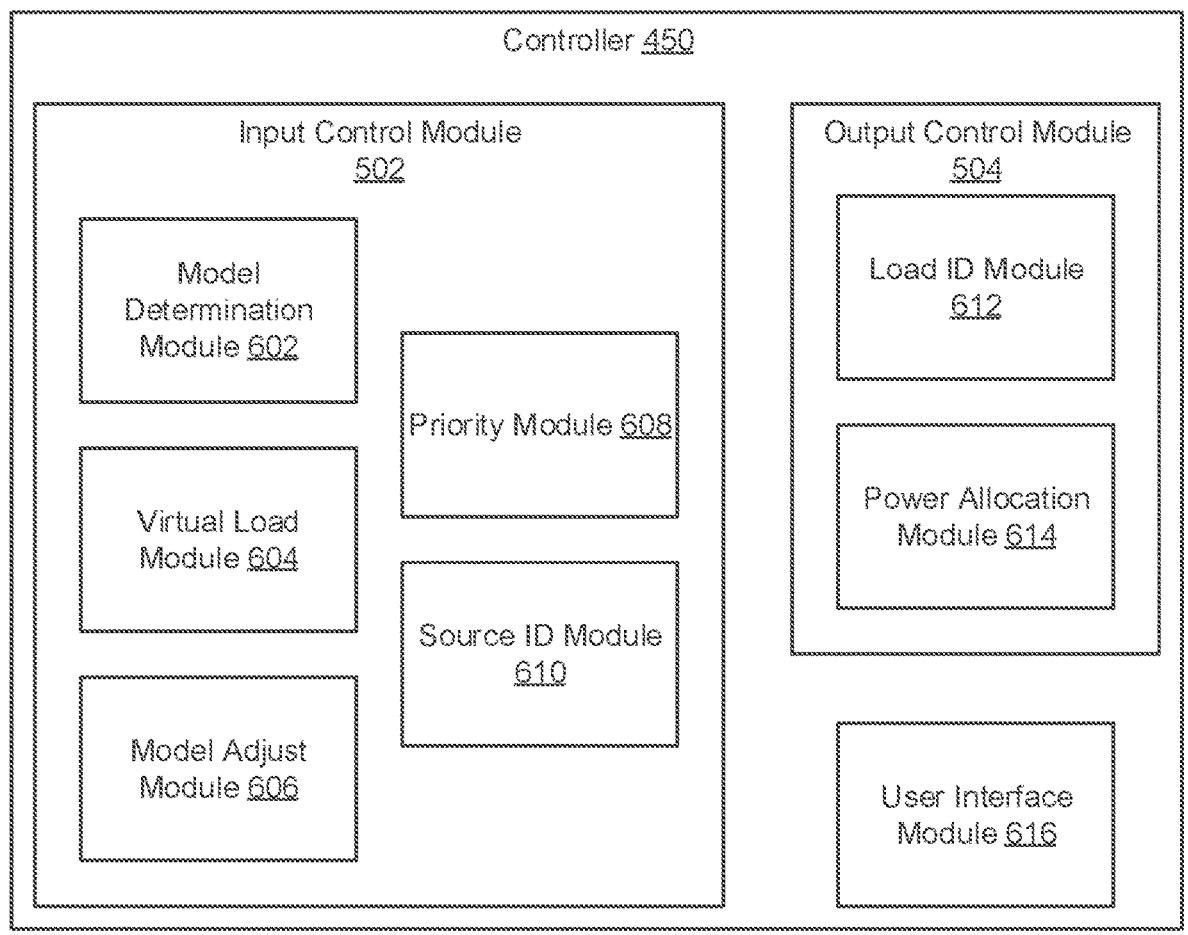
FIG. 6 is a schematic block diagram illustrating another embodiment of a controller for an energy storage apparatus.

FIG. 6 depicts one embodiment of a controller 450, which may be substantially as described above with reference to FIGS. 4 and 5, including an input control module 502 and an output control module 504. The input control module 502, in the depicted embodiment, includes a model determination module 602, a virtual load module 604, a model adjust module 606, a priority module 608, and a source identification (ID) module 610. The output control module 504, in the depicted embodiment, includes a load ID module 612, and a power allocation module 614. The controller 450, in the depicted embodiment, includes a user interface module 616.

In some embodiments, the controller 450 may use the model determination module 602 and the virtual load module 604 to implement load curve based control of input power. As described above, an input power converter 452 may be controlled to present a virtual resistance (defined as input voltage V divided by input current I) to a power source 102 connected to the input power converter 452. Different virtual resistances may result in drawing different amounts of power from the power source 102, depending on the current-voltage curve for the source 102.

Figure 8:
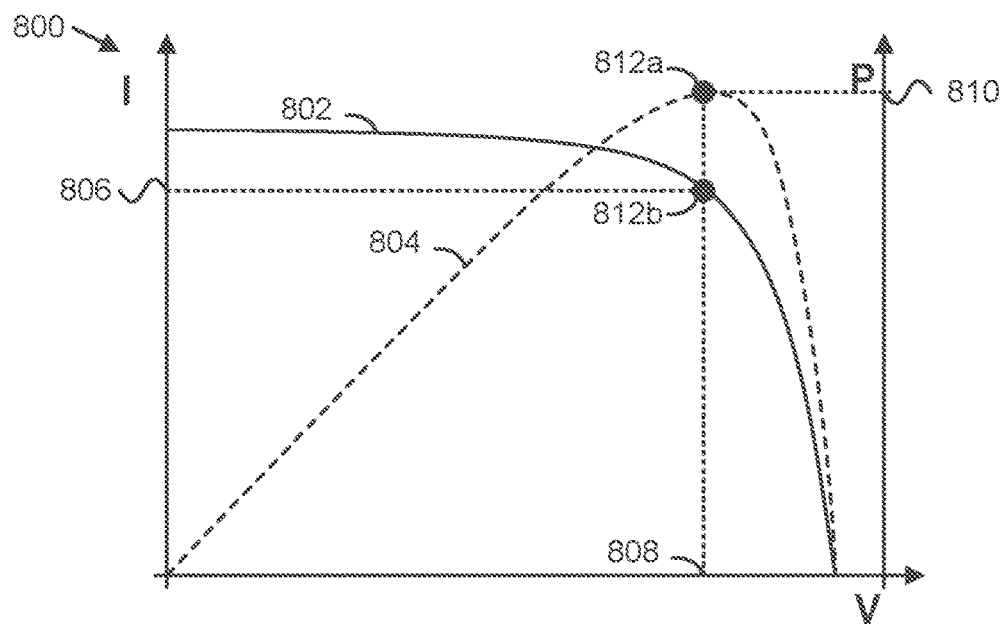
FIG. 8 is a graph showing embodiments of a current-voltage curve and a power curve fora solar panel, in one embodiment.

Referring now to FIG. 8, a graph 800 depicts a current-voltage (I-V) curve 802 (solid line) for a solar panel 104. Current is depicted on the vertical axis, and voltage on the horizontal axis. A short circuit or zero-resistance connection across the panel 104 results in a voltage drop of zero volts and a maximum "short circuit current." Conversely, an open circuit or infinite resistance across the panel 104 results in a maximum "open circuit" voltage. An input power converter 452 that presents a virtual resistance to the panel 104 will result in a combination of input current and input voltage at a point on the current-voltage curve 802 consistent with the virtual resistance, or voltage/current ratio.

A power curve 804 (dashed line) is also depicted, showing power on the vertical axis relative to voltage on the horizontal axis. Because power is voltage times current, it may be seen that the power is zero at both the open circuit voltage (with zero current) and at the short circuit current (with zero volts). A "power point" may refer to a combination of voltage and current, or a point on the I-V graph 800. A maximum power point 812b is depicted on the current-voltage curve 802, with a corresponding point 812a at the maximum of the power curve 804. At the maximum power level 810, the current 806 is less than the short circuit current, and the voltage 808 is less than the open-circuit voltage, but the power (e.g., the height of the power curve 804) is maximized. Accordingly, a controller 450 may control the input current or voltage for an input power converter 452 to track or approximate the maximum power point 812b.

Figure 7:
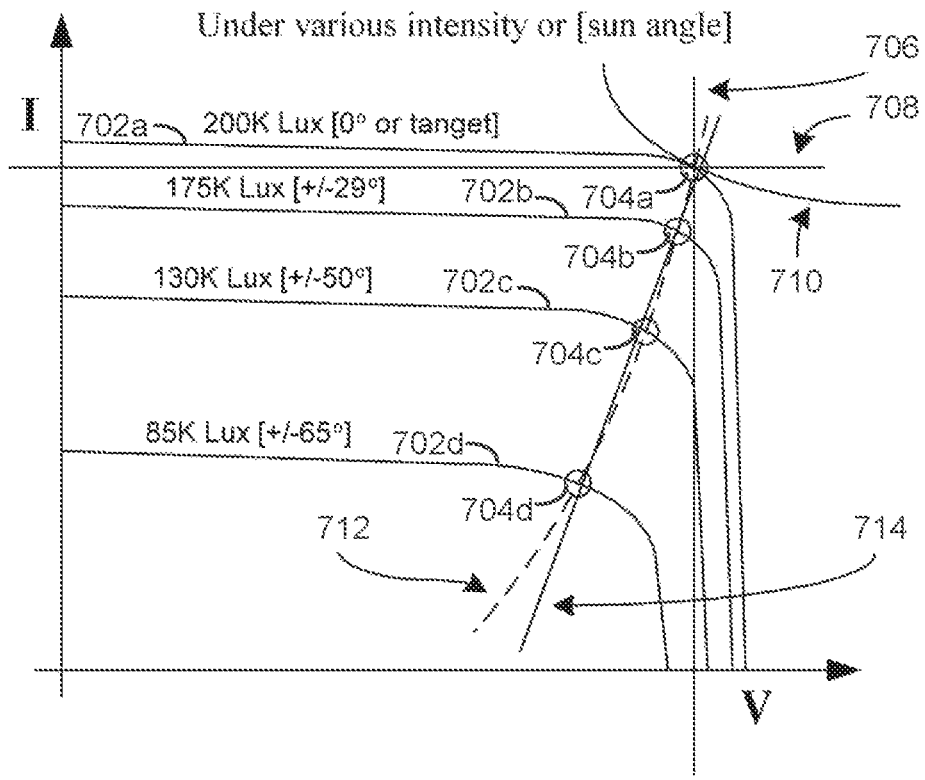
FIG. 7 is a graph showing current-voltage curves for solar panels, in one embodiment.

However, the current-voltage curve 802 in FIG. 8 is depicted for theoretical constant light intensity. An actual solar panel 104 may have different current-voltage characteristics in different conditions or at different levels of illumination. Referring now to FIG. 7, a graph depicts multiple current-voltage curves 702 for solar panels 104 illuminated at different intensities (e.g., at different sun angles corresponding to different latitudes or seasons of the year). Maximum power points 704 are marked on the current-voltage curves 702.

A variety of load curves 706, 708, 710, 712, 714, are also depicted. A "virtual resistance" as described above, may be a ratio of input voltage to input current for an input power converter 452, which, if constant, could be represented as a diagonal line through the origin on the graph 700. However, in certain embodiments, a controller 450 may control an input power converter 452 to act as a load (from the perspective of the power source 102) with non-constant virtual resistance. The current drawn by an input power converter 452 at a particular input voltage could be represented as a point on the graph 700, and the set of such point could form a curve showing the current drawn by an input power converter 452 across a range of input voltages. A current-voltage curve relating input current drawn by an input power converter 452 to input voltage may be referred to as a "load curve" showing the behavior of the input power converter 452 as a load from the perspective of the power source 102. A load curve intersects a current-voltage curve for the power source 102 at the voltage where the current provided by the source 102 matches the current drawn by the input power converter 452. Thus, the input current and voltage may be determined by where a load curve implemented by a controller 450 for an input power converter 452 intersects the current-voltage curve for the power source 102 under its current conditions.

However, some load curves may result in inefficient power usage. Load curve 710 is a constant power curve intersecting the maximum power point 704a for full illumination (current-voltage curve 702a). At full illumination of the solar panel 104, maximum power will be transferred to the input power converter 452. At lower illumination, however, no power will be transferred as the load curve 710 does not intersect the lower-illumination current-voltage curves 702b-d. A constant voltage load curve 706 or a constant current load curve 708 may similarly intersect the maximum power point 704a for a full illumination solar panel 104, but may be inefficient at lower illuminations where the constant voltage curve 706 results in sharply reduced or zero current, and the constant current curve 708 results in sharply reduced or zero voltage.

An ideal load curve 712 would intersect the maximum power points 704 for all of the current-voltage curves 702 of a power source 102 under different conditions. Load curve 714 represents a linear approximation to the ideal load curve 712. The virtual load presented to the power source 102 by an input power converter 452 controlled in accordance with load curve 714 is equivalent to a fixed resistance in series with a fixed voltage. Various ways of controlling an input power converter 452 to approximate or track maximum power points 704 may be referred to as maximum power point tracking. Load curve based control, as implemented by the model determination module 602 and the virtual load module 604 may be one method of maximum power point tracking.

Returning to FIG. 6, the model determination module 602 may determine a load curve model based on the power source 102 coupled to an input power converter 452. A load curve model may be a load curve that models or approximates maximum power points of the power source 102 under different conditions, such as the linear load curve 714 of FIG. 7, a higher-order polynomial curve, a non-polynomial (e.g., exponential) curve or the like. In one embodiment, the model determination module 602 may sweep input voltage and current under different conditions for a power source 102 to determine a plurality of maximum power points, and may calculate a load curve model that approximates the maximum power points. For example, the model determination module 602 may identify the maximum power points 704a-d under different illumination conditions, and may determine a slope and intercept for a load curve corresponding to a fixed resistance in series with a fixed voltage.

In another embodiment, the model determination module 602 may determine a load curve model by referring to a predetermined model. For example, a predetermined slope and intercept for a load curve corresponding to a fixed resistance in series with a fixed voltage may be provided, and referenced by the model determination module 602 to implement the load curve 714. In some embodiments, a controller 450 may be provided with predetermined load curve models for different types of power sources 102 (e.g., for solar versus wind power), and the model determination module 602 may use the load curve model for an input power converter 452 corresponding to the type of power source 102 that is connected to that input power converter 452. Although current-voltage curves and load curve models have been described with reference to solar panels 104, a multi-input controller 450 may similarly implement load curve based control to approximate maximum power points for other renewal energy sources 102, such as wind, hydro, or geothermal power sources 102.

The virtual load module 604, in various embodiments, may control an input power converter 452 to present a load to the power source 102 connected to that converter, based on the load curve model determined by the model determination module 602. Presenting a load based on the load curve model may involve controlling the input current and/or voltage to match points on the load curve. The virtual load module 604 may iteratively monitor input voltage and/or current, and may adjust the input voltage or current to conform to the load curve model. For example, if the input current and/or voltage are at a point not on the load curve model, the virtual load module 604 may adjust the input current and/or voltage to be at a point closer to the load curve model. In some embodiments, the virtual load module 604 may monitor or adjust the input voltage in a timeframe comparable to the duty cycle of switching components for an input power converter 452. For example, the virtual load module 604 may adjust the input current and/or voltage every 50 to 400 microseconds, which may be every on/off cycle for a switching component or every eight on/off cycles for a switching component.

The model adjust module 606, in some embodiments, is configured to periodically adjust at least one parameter of a load curve model determined by the model determination module 602 and used by the virtual load module 604 to adjust input current or voltage. In various embodiments, a load curve model may inaccurately approximate some maximum power points. In some embodiments, current-voltage curves for a power source 102 may change as the source 102 ages. Accordingly, changing parameters of a load curve model may allow the model to change over time. In some embodiments, the model adjust module 606 may change a parameter by moving the load curve model left or right on the I-V graph. In another embodiment, the model adjust module 606 may change a first-order parameter (e.g., the slope of the load curve 714) or a higher-order parameter. In some embodiments, the model adjust module 606 may adjust a parameter in both directions (e.g., moving the load curve 714 left or right), and select the adjustment that maximizes power.

In certain embodiments, the model adjust module 606 may adjust parameter(s) on a longer timeframe than the virtual load module 604 uses to implement the load curve model. For example, the virtual load module 604 may sense or adjust an input current or voltage on a 50-400 microsecond timeframe, while the model adjust module 606 may adjust the load curve model left or right on a 25-500 millisecond timeframe (e.g., slower than the model adjust module 606 by several orders of magnitude). In some embodiments, periodically adjusting parameters of a load curve model may provide increased power output compared to other maximum power-point tracking methods. Additionally, in certain embodiments, the model adjust module 606 may adjust parameters when triggered by a condition occurring, such as power levels dropping below a threshold power level.

Other hill-climbing or optimization methods may similarly periodically adjust a virtual load. However, the combination of long-timescale adjustments to the model by model adjust module 606 and short-timescale implementation of the model virtual load module 604 may provide increased efficiency compared to other maximum power-point tracking methods.

The priority module 608, in some embodiments, is configured to control power flow through multiple input power converters 452 based on a prioritization of power sources 102. A prioritization of power sources 102 may be any rule or set of rules for determining which power sources 102 to draw power from (if not drawing maximum power from all sources 102). In some embodiments, a prioritization may be a ranking of which power sources 102 have higher or lower priorities. In further embodiments, renewable power sources 102 may be prioritized over non-renewable sources 102. For example, a priority module 608 may control power flow to maximize power drawn from solar panels 104, draw additional power from a limited hydropower reservoir if needed, and to supplement with grid power. In some embodiments, a prioritization may be user controlled. For example, a user may indicate, via a user interface, which sources 102 to use more or less often. In another embodiment a prioritization may be preconfigured by a manufacturer.

In some embodiments, the priority module 608 may control power flow based on one or more parameters relating to the power sources 102. Parameters may be parts of a prioritization that are not strict rankings of higher or lower priority, but that otherwise describe which power sources 102 to draw power from. For example, parameters relating to power sources 102 may include a current price for grid power, a current water level in a hydropower reservoir, or the like. A priority module 608 may control power flow through multiple input power converters 452 from different power sources 102 to maximize renewable energy use, to minimize a cost per joule, or the like.

Figure 9:
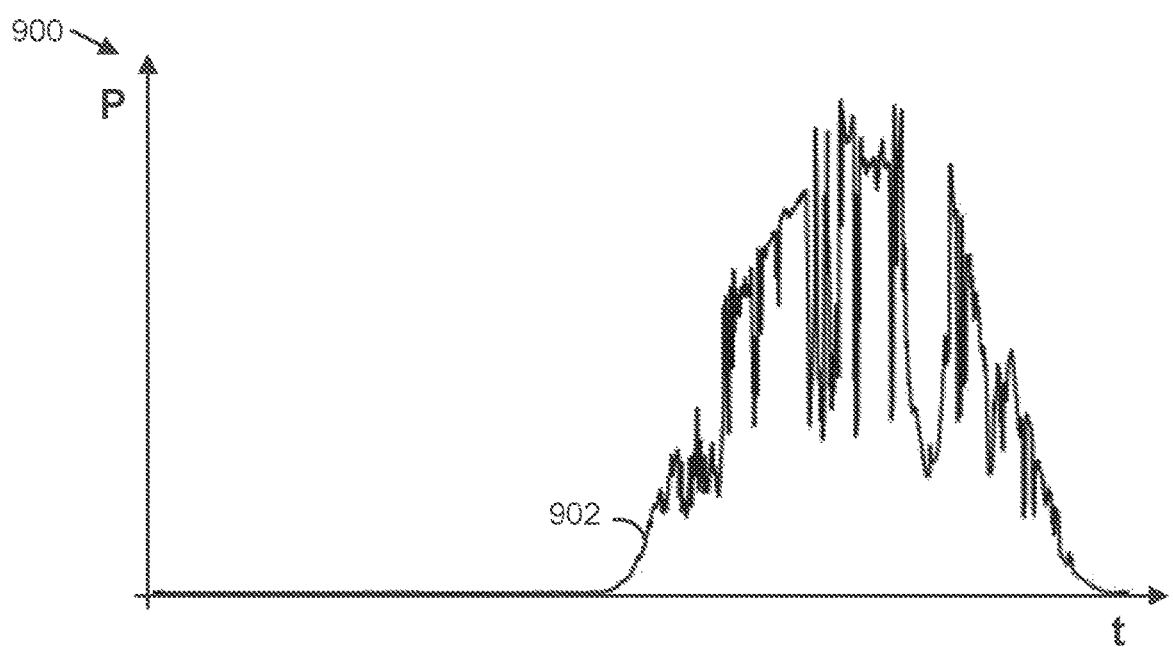
FIG. 9 is a graph showing power over time for a solar panel, in one embodiment.

The source identification module 610, in the depicted embodiment, is configured to monitor current and voltage over time for at least one of the power sources 102 and identify a type of power source 102 consistent with the monitored current and voltage. The source identification module 610 may sweep an I-V curve for a power source 102, or may otherwise monitor power. For example, in FIG. 9, a graph 900 depicts power levels 902 produced by a solar panel 104 over the course of a day, with time on the horizontal axis, and power on the vertical axis. Power production is intermittent due to weather, but generally conforms to an "envelope" of zero power production at night, increasing power production until the sun reaches its zenith for the day, and decreasing power production until sunset. The source identification module 610 may monitor input current and voltage from a power source 102 over the course of one or more days to determine a curve, similar to FIG. 9 of power production over time.

The source identification module 610 may apply a digital filter to smooth the curve 902 to more clearly identify an envelope. For example, a digital signal processor may apply a concave boundary identification algorithm to determine the outer edge of a two dimensional shape. As a result, the digital filter fills in the gaps when shadows of clouds fall on the solar panels 104 and reduce energy production. Further, the digital filter may eliminate the randomness in the data due to the noise.

The source identification module 610 may then identify a type of power source 102 consistent with the monitored current and voltage. For example, if the power source 102 is a solar panel 104, the actual power should not exceed a theoretical maximum for solar panels 104 at that date and location. The source identification module 610 may reference external factors to determine power production curves that might be expected for different types of power sources 102. For example, the source identification may refer to a current latitude and date to determine sunrise, sunset, sun angle, and a matching power production curve for solar power, or may refer to local wind conditions to determine expected power production for wind power. The source identification module 610 may identify a type of power source 102 consistent with the monitored current and voltage by comparing actual power production to expected power production for different types of power sources 102, such as for solar power versus wind power, and may validate that the actual power curve is consistent with the expected power curve for the identified type of power source 102.

In one embodiment, a source identification module 610 may monitor current and voltage over one or more days to identify the type of power source 102. In another embodiment, a source identification module 610 may monitor current and voltage over a shorter time period by sweeping an I-V curve for a power source 102. Monitored currents and voltages may be measured and recorded in a current or voltage sweep to create an I-V curve similar to the curve 802 of FIG. 8. The I-V curve is then compared with known characteristics of photovoltaic cells to identify whether solar power is in use. In some embodiments, the source identification module 610 may identify a type of power source 102 from a short-term I-V curve, from longer-term power production, or from a combination of both.

In further embodiments the source identification module 610 may control power flow through at least one of the input power converters 452 based on the identified type of power source 102. For example, the source identification module 610 may communicate with the model determination module 602 so that the load curve model used for maximum power point tracking is based on the type of power source 102 identified by the source identification module 610.

In some embodiments, the source identification module 610 may provide certification of renewable energy use. For example, the source identification module 610 may indicate the identified type of power source 102 to the user via a user interface, or may provide certification of the identified type of power source 102 to a tax authority to qualify the user for a renewable energy tax credit.

In the current solar energy market, it may be difficult to obtain a tax credit due to the complex requirement of providing certified proof that 80% or more of the energy used in the home is from a renewable energy source 102, and many solar power users do not receive this tax credit despite utilizing renewable resources. In some embodiments, a source identification module 610 may have the ability to not only accurately capture how much of the home's energy use is from the renewable sources 102 connected to the apparatus 108, but also specifically which renewable source 102 is primarily responsible. The source identification module 610 may use a combination of machine learning and predetermined information about the location of the installed system to read and verify the unique digital signature of the source 102. Different sources 102 have unique digital signatures (e.g. different spectral characteristics of their voltage and/or current waveforms) that the source identification algorithm can recognize. In addition, a maximum power output for a photovoltaic system can be calculated based on a GPS-determined location of the apparatus 108, the time and date, and the specifications of the photovoltaic solar panels 104, which can also be used by the source identification module 610 to help identify that the energy was generated from a renewable source 102.

Certification may be particularly relevant for a portable energy storage apparatus 108 that is not permanently installed at a fixed location. The apparatus 108 may include a Global Positioning Satellite (GPS) receiver used by the source identification module 610 to identify where the apparatus 108 and/or the solar panels 104 are located. The source identification module 610 may identify the type of power source based at least partially on the location identified by the GPS receiver. In various embodiments, identifying a type of power source may be based on a variety of information such as a GPS-determined position, a time and date, solar radiation patterns for a particular place and time, wind patterns for a particular place and time, or the like. An identification of a type of power source may be said to be at least partially based on the location identified by the GPS receiver if the GPS-determined location was used in some way (e.g., alone, in combination with other information, as a basis for solar radiation or wind information, or the like) to determine the type of power source.

For example, the source identification module may use the GPS-determined location to determine the solar radiation pattern corresponding to that specific location for the current date. These solar radiation patterns may be retrieved from a database via internet or calculated using an algorithm. Then, the filtered power production curve of solar panels 104, such as that described above, is compared with potentially available solar energy, which is a function of the time of day, date, and latitude, to validate that the power generated by solar panels 104 was actually coming from the sun, a renewable energy source 102, and may qualify for tax credits.

In a similar way, statistics for local wind and hydropower can also be analyzed based on location and season in order to accurately determine the amount of renewable energy used. This may also allow owners of recreational vehicles or portable tiny homes to continuously use a portable energy storage apparatus 108 as they move around, and still qualify for the carbon tax credits at the end of the year.

The load identification module 612 may be similar to the source identification module 610, but with monitoring of output power and identification of loads 110 rather than monitoring of input power and identification of sources 102. In some embodiments, the load identification module 612 may monitor current and voltage over time for at least one of the output connectors 410 or output power converters 460. The load identification module 612 may identify a type of load 110 consistent with the monitored current and voltage. For example, a light may draw power consistently in the evening and the morning, but not during sleep or daylight hours. Similarly, a refrigerator may draw power intermittently as a compressor turns on or off.

In one embodiment, the load identification module 612 may utilize a hidden Markov modeling or other machine learning techniques to identify individual loads 110 based on aggregate output power characteristics, or even to identify states of individual loads 110, such as whether a refrigerator compressor is currently on. In some embodiments, the load identification module 612 may provide information to a user, or may upload information to a multi-user database for aggregate use.

In some embodiments, the controller 450 may control output power (e.g., by controlling separate output power converters 460) based on the type of load 110 identified by the load identification module 612. For example, the controller 450 may ensure that sufficient power is output to a higher-priority load 110 such as a refrigerator, or may throttle back power to a lower priority load 110 such as a stereo system, if total power demand exceeds a threshold.

In some embodiments, the power allocation module 614 may control output power converters 460 to control how power is allocated to different loads 110 (e.g., based on identification of loads 110 by the load identification module 612, or based on other factors).

In one embodiment, the power allocation module 614 may allocate output power to the one or more loads 110 based on a prioritization of the one or more loads 110. A prioritization of one or more loads 110, like a source prioritization, may include ranking of loads 110 and/or may include other parameters. For example, for food safety, a refrigeration load 110 may be prioritized over another load 110, and power may be preferentially allocated to the refrigerator when limited power is available. Other parameters may affect priorities. For example, outside temperature may be a parameter used to determine whether to prioritize power allocation to a heating or air conditioning load 110. In some embodiments, a load prioritization or parameters may be user controlled. For example, a user may indicate, via a user interface, which loads 110 to prioritize. In another embodiment a load prioritization may be preconfigured by a manufacturer.

In some embodiments, the power allocation module 614 may allocate output power to one or more loads 110 based on communication with a second controller for at least one or more loads 110. For example, a controller for a load 110 with its own local energy storage may indicate the state of that energy storage, and the power allocation module 614 may prioritize power to that load 110.

Additionally, in some embodiments, a load 110 may be another energy storage apparatus 108 with its own controller 450 and power allocation module 614. For example, a small-scale grid may include multiple energy storage apparatuses 108 acting as sources 102 and loads 110 for each other. Controllers 450 may communicate to determine where to allocate stored energy and output power flow. Thus, multiple apparatuses 108 may share and pool power across a household or a neighborhood. For example, if a user has three energy storage apparatuses 108—one upstairs in the bedroom, one downstairs in the living room, and one down in the basement—and the power from the main utility grid goes out, the user can go "off-grid" and rely solely on the power provided from the inverters of connected energy storage apparatuses 108. The user can leave the systems running as stand-alone power providers for their respective loads 110, or they can transfer power between these three energy storage apparatuses 108 to ensure the most crucial appliances continue to receive power. For example, the user may redirect all power from the bedroom and living room energy storage apparatuses 108 down to the basement, where the main computer system 116 and freezer 112 are connected, to ensure that they do not lose power where it is most essential during a black out.

Additional, in some embodiments, networked energy storage apparatuses 108 may be used in a neighborhood, not only for pooling power during a power outage, but to productively manage energy use. In some embodiments, the energy storage apparatuses 108 are connected to each other through one or more cables. For example, if one neighbor works from home during the day, while others connected to the same network leave for work, they may set the shared system to pool power to the energy storage apparatus 108 of the neighbor that works from home during the day, and then redistribute it again once the others return home in the evening. Shared renewable energy in this form has the potential for a multitude of applications around the world to significantly reduce carbon emissions while maintaining current levels of power use, including, but not limited to: residential use (one or more connected homes or apartments), commercial use (one or more connected businesses), medical (connected devices or locations), construction (connected tools and machines), and the like. In some embodiments, a local utility provider may buy back some of the pooled power during peak demand periods, to the benefit of the users of energy storage apparatuses 108. Power allocation module 614 in multiple controllers 450 may communicate to allocate power.

The user interface module 616 may present information to a user via a user interface, such as a touch screen 306 or a network interface as described above. Information presented to a user may include information about input power, information about batteries 456 or other storage, and/or information about output power. Information about input power may include current, historical, and/or predicted information about power from sources 102, such as current power levels from one or more sources 102, total energy received from one or more sources 102 over a period of time, a history of where currently-stored energy came from, predicted energy generation for a future time period, or the like. Information about batteries 456 or other storage may include current historical, and/or predicted information about storage, such as individual battery energy levels, total stored energy levels, numbers of charge/discharge cycles, total capacity levels, a recommended replacement data for batteries 456, or the like. Information about output power may include current, historical, and/or predicted information about power to loads 110, including current power output, a history of power output, predicted power demands, or the like.

In various embodiments, the user interface module 616 may determine the information to be presented to a user, format the information to be presented to a user, or the like. In further embodiments, the user interface module 616 may receive control information from a user, such as prioritizations of sources 102 or loads 110, and may communicate that information to other modules of the controller 450 for controlling input or output power or stored energy levels.

Figure 10:
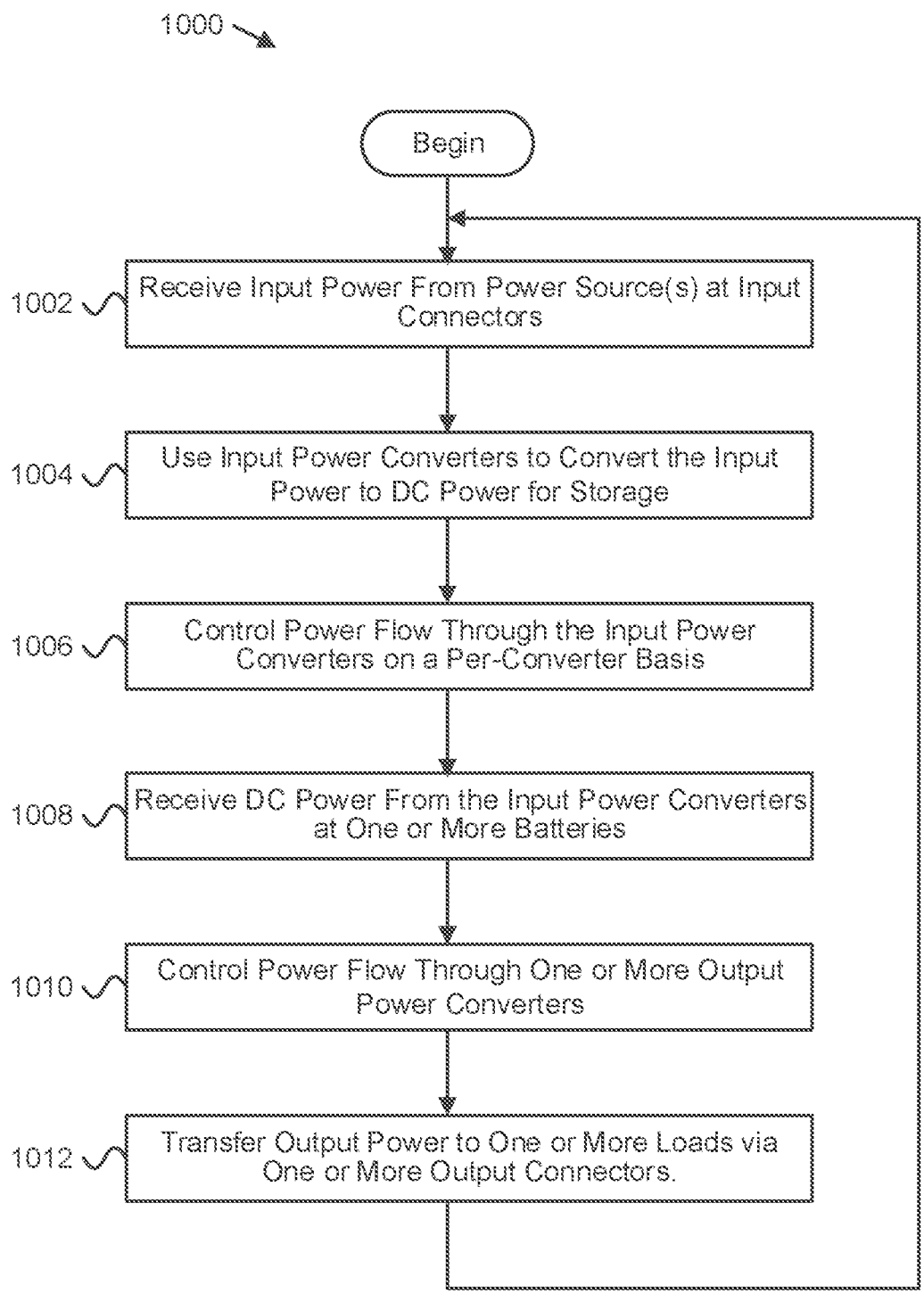
FIG. 10 is a schematic flow chart diagram illustrating one embodiment of a method for energy storage.

FIG. 10 is a schematic flow chart diagram illustrating one embodiment of a method for energy storage. The method 1000 begins, and an energy storage apparatus 108 receives 1002 input power from one or more power sources 102 at a plurality of input connectors 212. The apparatus 108 uses 1004 a plurality of input power converters 452 to convert the input power to direct current (DC) power for storage. A controller 450 controls 1006 power flow through the input power converters 452 on a per-converter basis such that separate converters are separately controlled. One or more batteries 456 coupled to the input power converters 452 receive 1008 DC power from the input power converters 452. A controller 450 controls 1010 power flow through one or more output power converters 460 coupled to the one or more batteries 456, to convert DC power from the one or more batteries 456 to output power for use by one or more loads 110. The apparatus 108 transfers 1012 the output power to one or more loads 110 via one or more output connectors 210, and the method 1000 continues as additional power is received, converted for storage, and output to loads.

Figure 11:
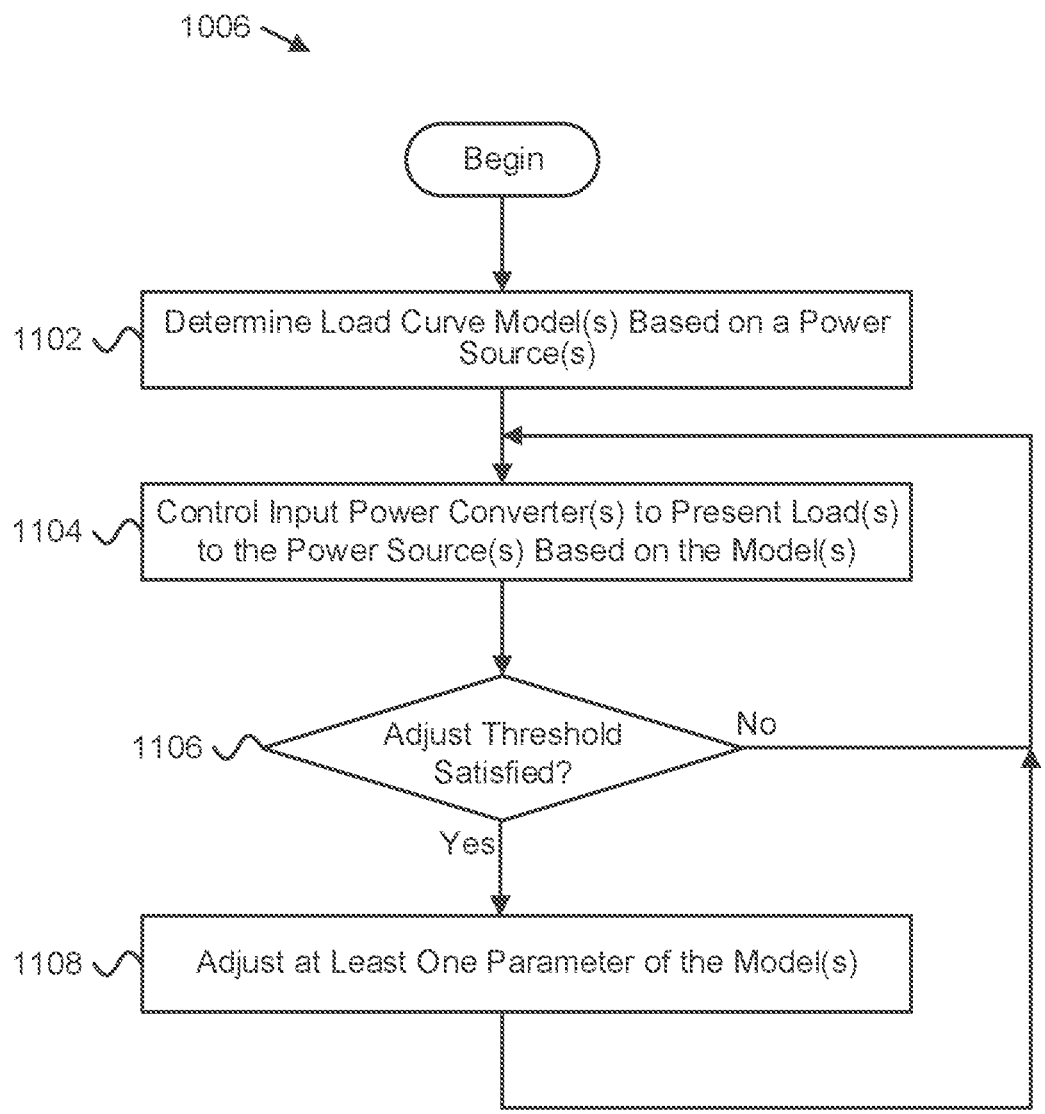
FIG. 11 is a schematic flow chart diagram illustrating one embodiment of a method for controlling power flow.

FIG. 11 is a schematic flow chart diagram illustrating one embodiment of a method 1006, which may be one embodiment of controlling 1006 power flow in the method 1000 of FIG. 10. The method 1006 begins, and a model determination module 602 determines 1102 one or more load curve models based on power source(s) 102 coupled to the input power converters 452. A virtual load module 604 controls 1104 one or more of the input power converters 452 to present load(s) 110 to the power source 102 based on the load curve model(s). A model adjust module 606 determines 1106 whether a threshold for adjusting a load curve model is satisfied. The threshold may be a time threshold, a power level threshold, or the like. If the threshold is satisfied, the model adjust module 606 adjusts 1108 at least one parameter of one or more of the load curve models, and the method 1006 continues, with control 1104 of the input power converter(s) 452 based on the adjusted model(s). If the threshold is not satisfied, the method 1006 continues with control 1104 of the input power converter(s) 452 based on non-adjusted load curve models.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
    a plurality of input connectors configured to receive input power from a plurality of power sources;
    a plurality of input power converters coupled to the input connectors, the input power converters configured to convert the input power to direct current (DC) power for storage;
    a controller configured to control power flow through the input power converters on a per-converter basis such that separate converters are separately controlled, by:
        monitoring currents and voltages over time received from a first power source and a second power source of the plurality of power sources;
        identifying separate types of power source for the first power source and the second power source consistent with the monitored currents and voltages;
        determining separate load curve models based on the identified types of power source; and
        controlling a first power converter and a second power converter of the plurality of input power converters to present separate loads to the first power source and the second power source based on the separate load curve models;
    one or more output power converters configured to convert stored DC power to output power for use by one or more loads, wherein the controller is configured to control power flow through the one or more output power converters; and
    one or more output connectors configured to transfer the output power to the one or more loads.

2. The apparatus of claim 1, wherein the controller is configured to control power flow based on a prioritization of the power sources.

3. The apparatus of claim 2, wherein the prioritization is user-controlled.

4. The apparatus of claim 1, wherein the controller is configured to control power flow based on one or more parameters relating to the power sources.

5. The apparatus of claim 1, wherein the controller is further configured to periodically adjust at least one parameter of at least one of the separate load curve models.

6. The apparatus of claim 1, further comprising a Global Positioning Satellite (GPS) receiver to identify where the apparatus is located, and wherein the controller is further configured to identify the types of power source based at least partially on the location identified by the GPS receiver.

7. The apparatus of claim 1, further comprising:
    one or more batteries coupled to the plurality of input power converters to receive DC power from the input power converters, and coupled to the one or more output power converters to output DC power to the one or more output power converters.

8. The apparatus of claim 7, further comprising:
    one or more stackable battery housings that house the one or more batteries;
    a stackable head unit housing that houses the input connectors, the input power converters, the controller, the one or more output power converters and the one or more output connectors; and one or more interconnects configured to provide detachable mechanical and electrical connections between pairs of adjacent stackable housings.

9. The apparatus of claim 7, further comprising a user interface configured to present information to a user, the information comprising one or more of: information about the input power, information about the one or more batteries, and information about the output power.

10. The apparatus of claim 9, wherein the user interface comprises one or more of a display screen and a network interface device.

11. The apparatus of claim 1, wherein the one or more output power converters comprise an inverter with gallium nitride based power electronics.

12. The apparatus of claim 1, wherein the controller is further configured to:
monitor current and voltage over time for at least one of the output connectors;
identify a type of load consistent with the monitored current and voltage; and
control output power based on the identified type of load.

13. The apparatus of claim 1, wherein the controller is configured to allocate output power to the one or more loads based on a prioritization of the one or more loads.

14. A method comprising:
receiving input power from a plurality of power sources at a plurality of input connectors;
using a plurality of input power converters to convert the input power to direct current (DC) power for storage;
controlling power flow through the input power converters on a per-converter basis such that separate converters are separately controlled, by:
monitoring currents and voltages over time received from a first power source and a second power source of the plurality of power sources;
identifying separate types of power source for the first power source and the second power source consistent with the monitored currents and voltages;
determining separate load curve models based on the identified types of power source; and
controlling a first power converter and a second power converter of the plurality of input power converters to present separate loads to the first power source and the second power source based on the separate load curve models;

receiving DC power from the input power converters at one or more batteries coupled to the input power converters;
controlling power flow through one or more output power converters coupled to the one or more batteries to convert DC power from the one or more batteries to output power for use by one or more loads; and
transferring the output power to the one or more loads via one or more output connectors.

15. The method of claim 14, wherein controlling the power flow is based on a prioritization of the power sources.

16. A system comprising:
at least one solar panel;
a plurality of input connectors configured to receive input power from a plurality of power sources comprising the at least one solar panel;
a plurality of input power converters coupled to the input connectors, the input power converters configured to convert the input power to direct current (DC) power for storage; and
one or more batteries coupled to the plurality of input power converters to receive DC power from the input power converters;
one or more output power converters coupled to the one or more batteries, the one or more output power converters configured to convert power from the one or more batteries to output power for use by one or more loads;
one or more output connectors configured to transfer the output power to the one or more loads; and
a controller configured to control power flow through the one or more output power converters, and to control power flow through the input power converters on a per-converter basis such that separate converters are separately controlled, by:
monitoring currents and voltages over time received from a first power source and a second power source of the plurality of power sources;
identifying separate types of power source for the first power source and the second power source consistent with the monitored currents and voltages;
determining separate load curve models based on the identified types of power source; and
controlling a first power converter and a second power converter of the plurality of input power converters to present separate loads to the first power source and the second power source based on the separate load curve models.

* * * * *